US012579246B2

(12) United States Patent
Zitlaw et al.

(10) Patent No.: US 12,579,246 B2
(45) Date of Patent: Mar. 17, 2026

(54) METHODS, DEVICES AND SYSTEMS WITH AUTHENTICATED MEMORY DEVICE ACCESS TRANSACTIONS

(71) Applicant: Infineon Technologies LLC, San Jose, CA (US)

(72) Inventors: Clifford Zitlaw, San Jose, CA (US); Yoav Yogev, Mazkeret-Batya (IL); Qamrul Hasan, San Jose, CA (US)

(73) Assignee: Infineon Technologies LLC, San Jose, CA (US)

( * ) Notice: Subject to any disclaimer, the term of this patent is extended or adjusted under 35 U.S.C. 154(b) by 504 days.

(21) Appl. No.: 18/144,013

(22) Filed: May 5, 2023

(65) Prior Publication Data

US 2024/0184875 A1    Jun. 6, 2024

Related U.S. Application Data

(60) Provisional application No. 63/429,621, filed on Dec. 2, 2022.

(51) Int. Cl.
G06F 21/44 (2013.01)
G06F 21/60 (2013.01)
G06F 21/72 (2013.01)

(52) U.S. Cl.
CPC ............ G06F 21/44 (2013.01); G06F 21/602 (2013.01); G06F 21/72 (2013.01)

(58) Field of Classification Search
CPC ........ G06F 21/44; G06F 21/602; G06F 21/72; G06F 21/64
See application file for complete search history.

(56) References Cited

U.S. PATENT DOCUMENTS

| | | | | |
|---|---|---|---|---|
| 7,657,287 | B2 * | 2/2010 | Hausner | H04W 12/08 |
| | | | | 455/551 |
| 12,009,023 | B2 * | 6/2024 | Wu | G11C 29/021 |
| 12,093,368 | B1 * | 9/2024 | Zircher | G06F 21/6218 |
| 2006/0174057 | A1 * | 8/2006 | Chen | G11C 7/22 |
| | | | | 711/103 |

(Continued)

FOREIGN PATENT DOCUMENTS

| | | |
|---|---|---|
| CN | 109086612 A | 12/2018 |
| JP | 2015018441 A | 1/2015 |

OTHER PUBLICATIONS

L.-W. Kim and J. D. Villasenor, "Dynamic Function Verification for System on Chip Security Against Hardware-Based Attacks," in IEEE Transactions on Reliability, vol. 64, No. 4, pp. 1229-1242, Dec. 2015. (Year: 2015).*

(Continued)

*Primary Examiner* — Kari L Schmidt

(57) ABSTRACT

A method can include determining the CS signal has transitioned from inactive to active and receiving at least target address information at a bus interface of the IC device. In response to target address information, retrieving data stored at a corresponding storage location of the IC device. By operation of authentication circuits, generating an authentication value using at least one cryptographic function that includes at least the authentication parameters and the retrieved data. The authentication value can be transmitted with retrieved data from the IC device. Corresponding devices and systems are also disclosed.

20 Claims, 26 Drawing Sheets

(56) References Cited

U.S. PATENT DOCUMENTS

| | | | | |
|---|---|---|---|---|
| 2020/0159657 | A1* | 5/2020 | Kida | G06F 12/1458 |
| 2020/0169459 | A1* | 5/2020 | Colombo | G06F 21/572 |
| 2020/0401533 | A1* | 12/2020 | Golov | H04L 9/0897 |
| 2021/0058387 | A1* | 2/2021 | Kocher | G06F 21/71 |
| 2021/0224201 | A1* | 7/2021 | Sandberg | H04L 9/3242 |
| 2022/0350362 | A1* | 11/2022 | Choi | G11C 7/22 |
| 2023/0215483 | A1* | 7/2023 | Kim | G11C 11/40615 |
| | | | | 365/222 |
| 2023/0388290 | A1* | 11/2023 | Kocher | H04L 63/083 |
| 2023/0420011 | A1* | 12/2023 | Noh | G11C 7/20 |
| 2025/0226982 | A1* | 7/2025 | Prather | H04L 9/14 |

OTHER PUBLICATIONS

Kim, Jungrae, et al. "All-inclusive ecc: Thorough end-to-end protection for reliable computer memory." ACM SIGARCH Computer Architecture News 44.3 (2016): 622-633. (Year: 2016).*
Oh, Byoungchan, et al. "Rethinking DRAM's page mode with STT-MRAM." IEEE Transactions on Computers 72.5 (2022): 1503-1517. (Year: 2022).*
Taiwan Office Action from Application 112145170 dated Apr. 28, 2025; 10 pages.

* cited by examiner

356A
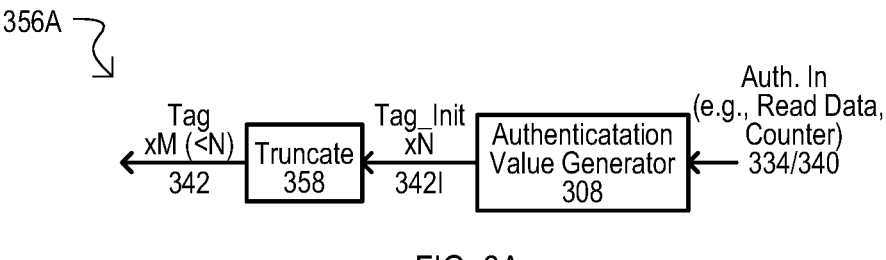
FIG. 3A
356B
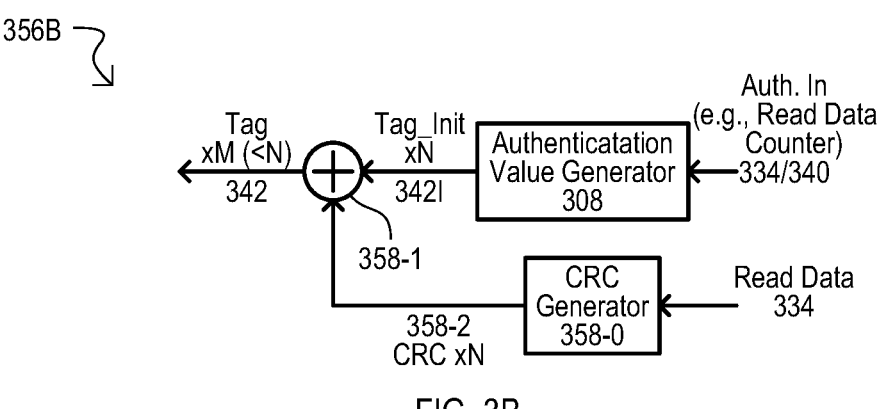
FIG. 3B
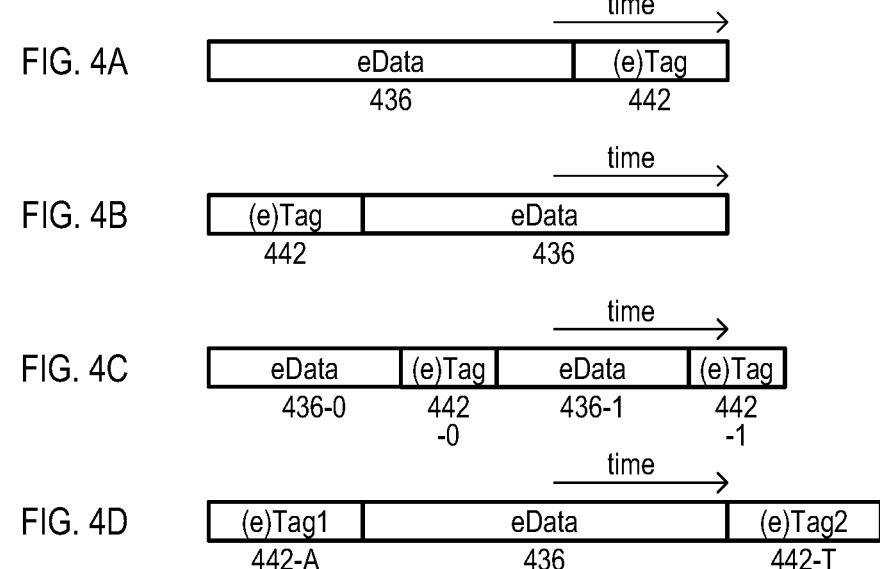
FIG. 4A
FIG. 4B
FIG. 4C
FIG. 4D

FIG. 6   (BACKGROUND)

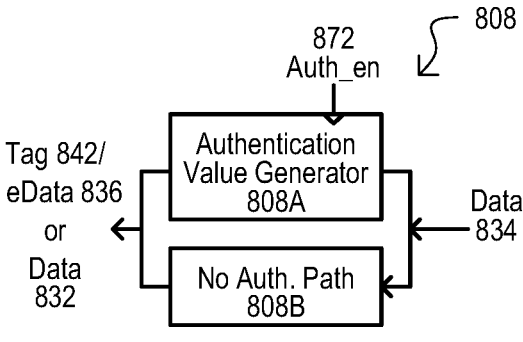
FIG. 8A
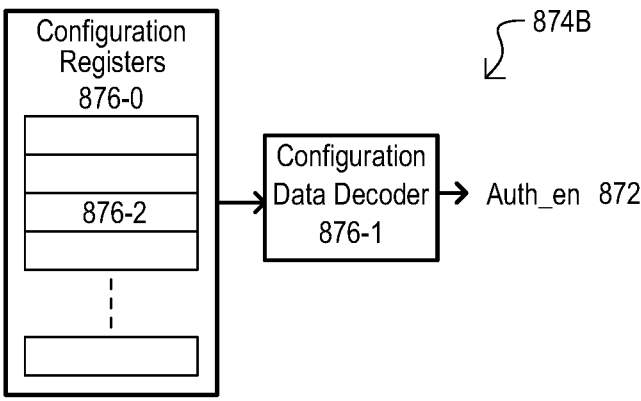
FIG. 8B
DEVICE CONFIG   876-0
| Reg. | Function | Variables | |
|------|----------|-----------|---|
| 0000h | Device Info | | |
| ⋮ | | | |
| XXXXh | Authenticated Ops | (e.g., Enable, Type, Latency, Format) | } 876-2 |
| ⋮ | | | |
| FFFFh | | | |
FIG. 8C

SERIAL INTERFACE　　878

| Command Name | Function | Instruction (Hex) | |
|---|---|---|---|
| ⁞ | ⁞ | ⁞ | |
| READ | Read | 13 | |
| FAST_READ | Read Fast | 0C | |
| AUTH_READ | Authenticated Read | XX | } 882-0 |
| ⁞ | ⁞ | ⁞ | |
| PP | Page Program | 12 | |
| AUTH_PP | Auth. Page Program | XX | } 882-1 |
| ⁞ | ⁞ | ⁞ | |
| SE | Sector Erase | 21 | |
| AUTH_SE | Auth. Sector Erase | XX | } 882-2 |
| ⁞ | ⁞ | ⁞ | |

902
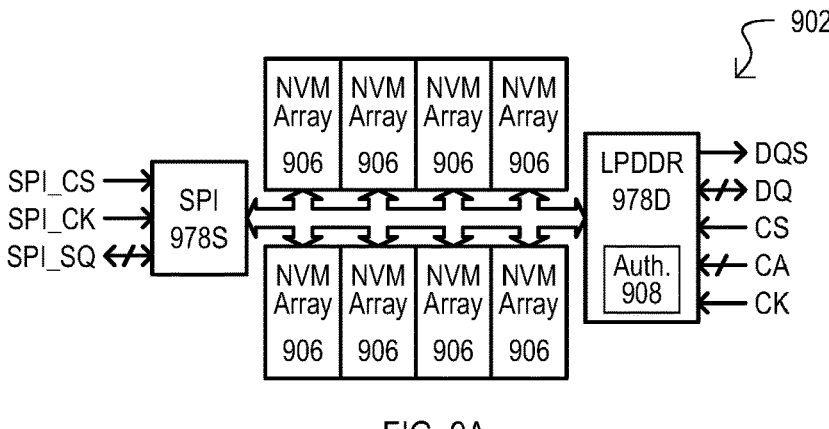
FIG. 9A
LPDDR INTERFACE
| | CS | CA PINS | | | | | | |
|---|---|---|---|---|---|---|---|---|
| | | CA0 | CA1 | CA2 | CA3 | CA4 | CA5 | CA6 |
| Authenticated | H | X | X | X | X | X | X | X |
| Read | L | X | X | X | X | X | X | X |
982
FIG. 9B
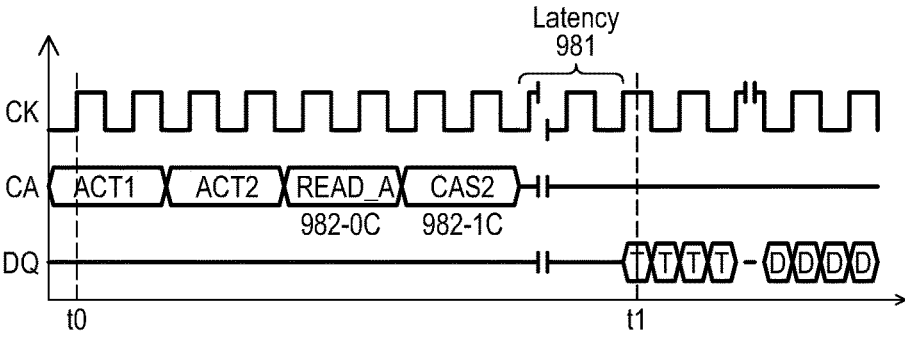
FIG. 9C
FIG. 9D

LPDDR INTERFACE

| | CS | CA PINS | | | | | | |
|---|---|---|---|---|---|---|---|---|
| | | CA0 | CA1 | CA2 | CA3 | CA4 | CA5 | CA6 |
| Authenticated | H | X | X | X | X | X | X | X |
| Write | L | X | X | X | X | X | X | X |

}982W

| Crypto | Data Encrypted | Data Authenticated | Device Authenticated | Initial Latency Adder | Total Latency Adder |
|---|---|---|---|---|---|
| Ascon AEAD | Yes | Yes | Yes | No | Transform p + Tag xfer (8 clks) |
| AES-GCM | Yes | Yes | Yes | No | GF multiply + Tag xfer (8 clks) |
| HMAC Data | No | Yes | Yes | No | HMAC (gen - 16 clks) + HMAC xfer (16 clks) |
| HMAC CRC | No | indirectly | Yes | No | HMAC (gen - 16 clks) + HMAC xfer (16 clks) |
| HMAC Counter | No | No | Yes | No - 16clk/32B in dummy | None |
| Encrypted CRC | No | indirectly | Yes | No | eCRC xfer (8 clks) |
| Encrypted Counter | No | No | Yes | No - 16clk/32B in dummy | None |

FIG. 13

| AES Key Size | Rounds |
|---|---|
| 128b | 10 |
| 192b | 12 |
| 256b | 14 |

| Step | Clocks |
|---|---|
| Encrypt D[31:16] | +1 |
| Encrypt D[15:0] | 10-8=+2 |
| Encrypt CTR | 10-8=+2 |
| Calculation Overhead | 1+2+2=+5 |
| eCTR Xfer | +8 |
| Total Transaction | 5+8=+13 |

2300A

2398

2499

Determine and Store Authentication Parameters
2499-0a

CS Active?
2499-0b

N

Y

Receive Command and Address on Bus Connections
2499-1

Command=
Authenticated Read?
2499-2

N

Process
Command
2499-3

Y

Access Read Data at Address
2499-4

Generate Authentication Value
for Read Operation using Authentication Parameters
2499-5

Transmit Read Authentication Values from Bus Connections
2499-6

2699

Determine Authentication Parameters
2699-0

Assert CS Active
2699-1a

Transmit Read Command and Address on Bus Connections
2699-1b

Receive Authenticated Read Transaction Data
2699-2a

Assert CS Inactive
2699-2b

Authenticate Transaction with Authentication Parameters
2699-3

METHODS, DEVICES AND SYSTEMS WITH AUTHENTICATED MEMORY DEVICE ACCESS TRANSACTIONS

CROSS REFERENCE TO RELATED APPLICATIONS

This application claims the benefit of U.S. Provisional Patent Application No. 63/429,621 filed on Dec. 2, 2022, the contents of which are incorporated by reference herein.

TECHNICAL FIELD

The present disclosure relates generally to authentication of memory devices, and more particularly to enabling per transaction authentication of memory device accesses, such as authenticated read operations.

BACKGROUND

Currently, many electronic platforms employing memory storage devices are concerned with the security of data access operations. A number of specifications, including some automotive specifications, require that code and data stored by a memory device be authenticated prior to execution.

Conventionally, systems can employ a "shadow" memory for improved security. In such an arrangement, code for execution can be transferred from a nonvolatile memory (NVM) to a volatile memory. A host (e.g., device that would execute code) can authenticate the code that has been transferred to the volatile memory. Shadow memory approaches are not compatible with execution-in-place (XiP) designs, where code is advantageously executed directly from an NVM, as only the code resident on the volatile memory is authenticated.

It would be desirable to arrive at some way of improving security in systems with memory devices over conventional approaches, such as those that use shadow memory.

SUMMARY

Embodiments can include establishing authentication parameters for an integrated circuit (IC) device. In response to an access command, such as a read command, the IC device can access data stored in one or more arrays at an address indicated by the access command. In response to the same read command, by operation of authentication circuits on the IC device, an authentication value can be generated using the authentication parameters and the accessed read data. The authentication value can be transmitted from the IC device with the accessed read data. In some embodiments, accessed data can be code for execution by a requesting device, and the IC device can be a nonvolatile memory to enable secure execution-in-place operations.

BRIEF DESCRIPTION OF THE DRAWINGS

FIGS. 3A and 3B are diagrams showing the generation of truncated authentication values according to embodiments.

FIGS. 4A, 4B, 4C and 4D are diagrams showing output formats for data and corresponding authentication values according to embodiments.

FIG. 6 is a timing diagram showing a conventional read operation with "dummy" cycles.

FIGS. 8A, 8B, 8C, 8D and 8E are diagrams showing the enabling of authenticated transactions according to an embodiment.

FIGS. 9A, 9B, 9C, 9D, 9E and 9F are diagrams showing authenticated read and write operations for a memory device having a LPDDR compatible interface, according to embodiments.

FIG. 13 is a table showing various authentication/encryption operations and corresponding latencies according to embodiments.

DETAILED DESCRIPTION

According to embodiments, a memory device can include built-in, per transaction authentication. In response to access requests (e.g., commands and/or address information), a memory device can return data requested by the access, as well as one or more authentication values. An authentication value can authenticate the returned data and/or the memory device itself. According to embodiments, any suitable transaction between a memory device and another device (e.g., host device) can include an authentication value and, where appropriate, encrypted data (e.g., write/program commands with encrypted write data and corresponding authentication value). A memory device can receive a request for data and then service such a request in a single transaction. In some embodiments, such a single transaction can be indicated by the assertion of a chip select (CS) signal for the memory device.

In some embodiments, a memory device can be a nonvolatile memory (NVM) device with per transaction authentication. Such a memory device can enable secure execute-in-place (XiP) operations.

In some embodiments, accessed data can be read data that is encrypted for authentication.

In some embodiments, a device authentication value can be generated while read data are being accessed, and output prior to encrypted read data.

In some embodiments, authentication values can be a generated with non-repeating number sequences to authenticate the transaction.

In some embodiments, a memory device can include a serial interface that can receive command and address data over a same bus. In addition or alternatively, a memory device can include a command-address bus that is separate from a data bus.

Figure 1:
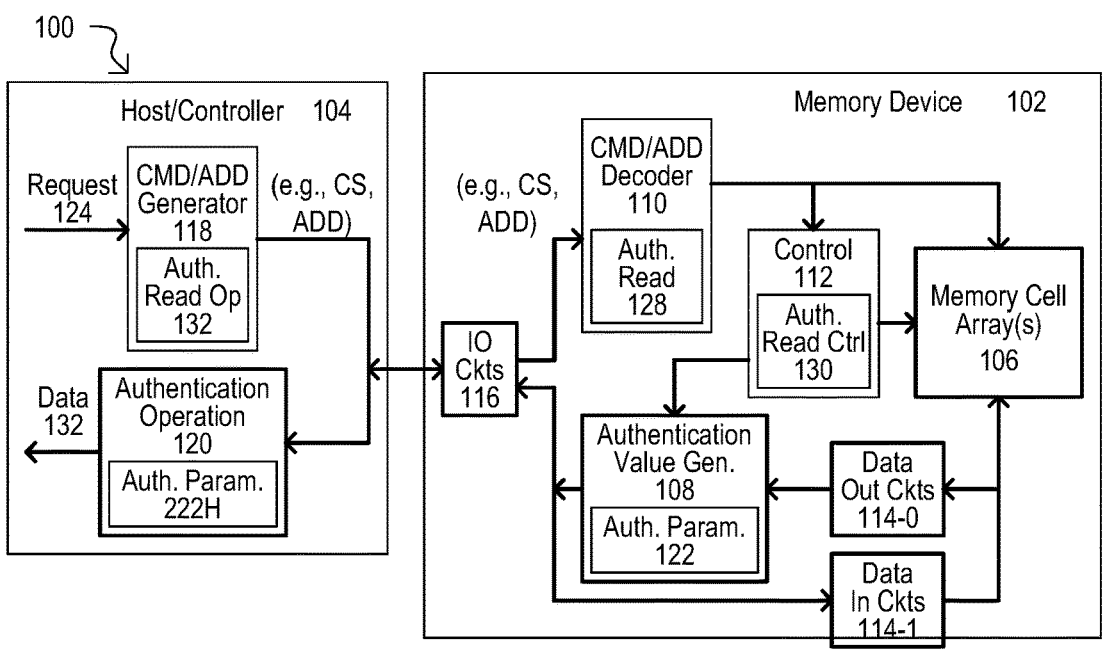
FIG. 1 is a block diagram showing a system with authenticated transactions according to an embodiment.

FIG. 1 is a block schematic diagram of a system 100 according to an embodiment. A system 100 can include a memory device 102 that can be accessed by a host (or controller) device 104. A memory device 102 can include one or more memory cell arrays 106, an authentication circuit 108, a command/address decoder circuit 110, control circuits 112, data out circuits 114-0, data in circuits 114-1 and input/output (IO) circuits 116. Memory cell array(s) 106 can include memory cells for storing data. Such memory cells can be of any suitable type, including nonvolatile or volatile memory cells. In some embodiments, such memory cells can be NVM cells for storing system data that must be retained without power, including but not limited to configuration data and/or firmware. Memory cell array(s) 106 formed with NVM cells can enable XiP operations that employ authenticated read transactions as described herein and equivalents. In some embodiments, a memory device 102 can receive at least a CS signal (CS) and address information (ADD) to access stored data and return such data (encrypted or not encrypted) with a corresponding authentication value.

Authentication value generator circuits (referred to as authentication circuits) 108 can generate one or more authentication values for output in a transaction. Authentication circuits 108 can operate according to authentication parameters 122, which can be known by, or generated by communication with host device 104. Authentication values can include data authentication values and/or device authentication values. A data authentication value can authenticate data provided by a memory device 102 during a transaction. A device authentication value can authenticate the memory device 102 itself during a transaction. It is noted that such authentication values correspond to a transaction with a memory device, and so significantly differ from a one-time authentication of a device in response to an event (e.g., power-on or reset). As will be described in more detail herein, an authentication value can be encrypted read data and/or one or more values transmitted with read data.

IO circuits 116 can receive commands/instructions from host device 104 to initiate transactions. 10 circuits 116 can be compatible with any suitable interface (IF), including serial IFs such as Serial Peripheral Interface (SPI) and parallel IFs. 10 circuits 116 can also transmit data to a host device 104, including transaction data and authentication values. Command and address decoders 110 can decode commands and addresses received from a host device 104. Decoded addresses can access memory cells within memory cell array(s) 106.

Decoded commands can include any commands suitable for accessing memory cell array(s) 106, including an authenticated read command 128. An authenticated read command 128 can access read data and return one or more authentication values, as described herein. As will be described in more detail herein, an authenticated read command 128 can take various forms. In some embodiments, a memory device 102 can be configured to authenticate all read transactions. In such a case all read commands can be authenticated read commands. In addition or alternatively, an authenticated read command can be a command separate from a standard read command. Control circuits 112 can generate control signals in response to received commands, including authenticated read control signals 130. In some embodiments, authenticated read control signals 130 can access memory cell array(s) 106, but then can also activate authentication circuits 108. In some embodiments, a memory device 102 can access stored data in response to a command (e.g., read) with a corresponding address. However, in other embodiments, a memory device 102 can access stored data in response to address data without a command (i.e., the type of transaction is implied by state or mode of operation of the memory device).

Data out circuits 114-0 can include any suitable circuits for providing output data from the memory cell array(s), including but not limited to sense amplifiers, additional decoding circuits, error code (e.g., ECC) generation circuits, masking circuits, etc. Data in circuits 114-1 can include any suitable circuits for providing input data to the memory cell array(s), including but not limited to write buffers, write amplifiers, programming circuits (for NVM cells), and write masking circuits.

A host device 104 can include a command/address (CMD/ADD) generator circuit 118 and authentication circuits 120. In response to requests 124, a CMD/ADD generator circuit 118 can generate a command, and optionally, address data for transactions with memory device 102. Such CMD/ADD values can include an authenticated read operation 132. As understood from herein, in the event a memory device 102 has been so configured, an authenticated read operation 132 can include a standard read command and corresponding address. However, in other embodiments an authenticated read operation 132 can generate an authenticated read command which can be different than (e.g., have different bit values) than a standard read command.

Authentication operation circuits 120 can authenticate transactions with memory device 102 using received authentication values and authentication parameters 122H. Authentication parameters 122H can correspond to authentication parameters 122 of authentication circuits 108 in memory device 102. As will be described herein, authentication operation circuits 120 can perform any suitable function based on the authentication value(s) received. This can include but is not limited to decrypting encrypted data and generating authentication values for comparison to authentication values received from memory device 102. In some embodiments, authentication operation circuits 120 can provide requested data 132, which can be unencrypted read data provided the transaction has been authenticated.

In this way, a system can include a memory device that can provide authentication values in response to authenticated read commands. Such authentication values can authenticate the read data accessed and/or the memory device providing the read data.

FIGS. 2A to 2G are diagrams showing authentication configurations for a systems according to various embodiments. Each of FIGS. 2A to 2G shows an authentication circuit that can be included in a memory device, as well as a corresponding authentication operation circuit that can be included in a corresponding host device.

Figure 2A:
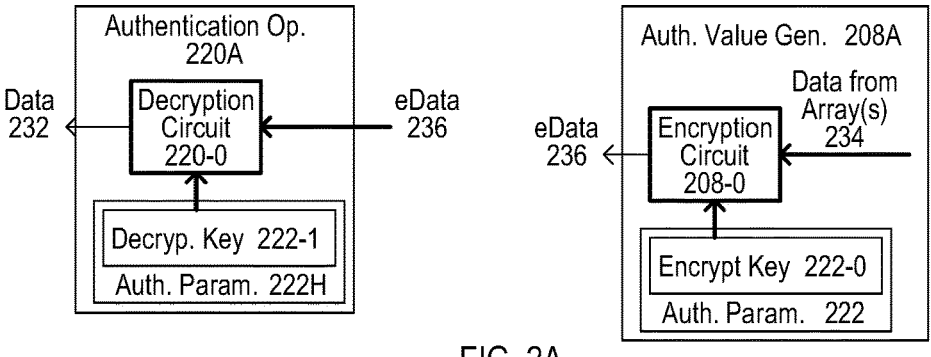
FIGS. 2A, 2B, 2C, 2D 2E, 2F and 2G are diagrams showing system authentication circuits according to various embodiments.

FIG. 2A shows authentication by the encryption of read data. Authentication circuits 208A of a memory device can include an encryption circuit 208-0 that operates according to authentication parameters 222. Authentication circuits 208A can take any suitable form, including dedicated logic, instructions executed by one or more processors, or a combination thereof. In response to a transaction (e.g., read operation), data from array(s) 234 can be received by encryption circuit 208-0 to generate encrypted data 236. Such encryption can occur according to one or more encryption keys 222-0, which can be included within authentication parameter 222. Encrypted data 236 can be transmitted to a host device in any suitable fashion, including but not limited to, over a bus.

Referring still to FIG. 2A, authentication operation (op) circuits 220A of a host device can include a decryption circuit 220-0 that operates according to authentication parameters 222H, which can include decryption key(s) 222-1 corresponding to encryption key(s) 222-0. Decryption circuits 220-0 can take any suitable form as described for encryption circuits 208-0. Decryption circuits 220-0 can provide decrypted data 232, which can be read data. In some embodiments, read data can include a corresponding ECC code, or the like.

In this way, encrypted read data can serve to authenticate a read transaction with a memory device.

Figure 2B:
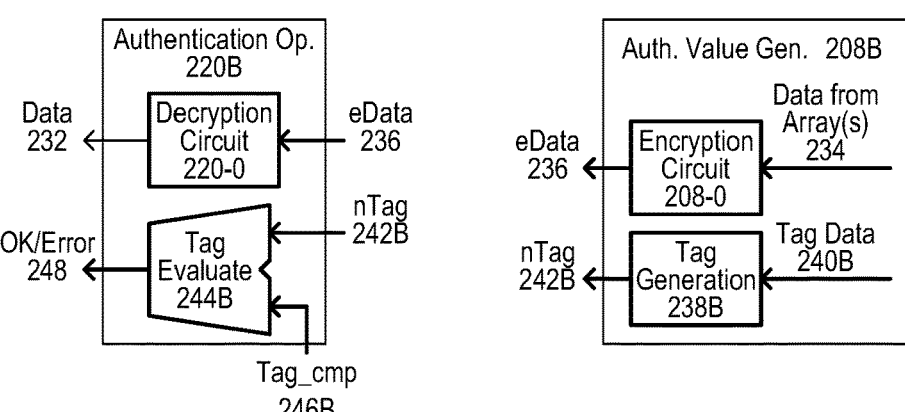

FIG. 2B shows an authentication configuration which can provide both encrypted read data and a corresponding authentication value (referred to as a "tag" herein). Authentication circuits 208B of a memory device can include an encryption circuit 208-0 and tag generation circuit 238B. An encryption circuit 208-0 can take the form of that described for FIG. 2A, or an equivalent. A tag generation circuit 238B can generate a tag 242B from tag data 240B. Tag data 240B can take various forms, as described herein. In some embodiments, tag data 240B can include or be related to, data from arrays 234, and thus can be used to authenticate the data (e.g., read data). In addition or alternatively, tag data 240B can include device data that can be used to authenticate the memory device. A tag 242B can be transmitted with encrypted data 236 to a host device.

Referring still to FIG. 2B, authentication op circuits 220B of a corresponding host device can include decryption circuits 220-0 and tag evaluation circuits 244B. A decryption circuit 220-0 can take the form of that described for FIG. 2A, or an equivalent. Tag evaluation circuits 244B can compare a received tag 242B to a compare tag 246B to generate an authentication result 248. Authentication result 248 can be used to authenticate the transaction.

In this way, a memory device can return encrypted data and an authentication tag to authenticate a read transaction.

Figure 2C:
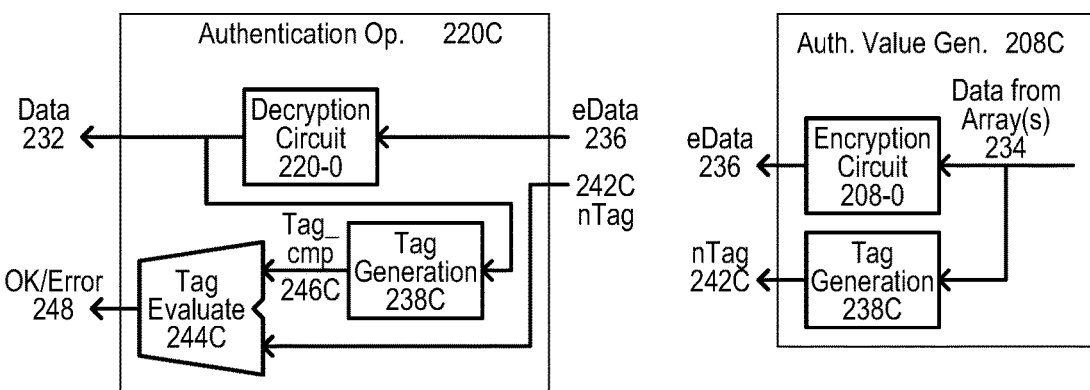

FIG. 2C shows an authentication with encrypted read data, and a tag that can authenticate the read data. Authentication circuits 208C of a memory device can include an encryption circuit 208-0 and tag generation circuit 238C. An encryption circuit 208-0 can take the form of that described for FIG. 2A or an equivalent. A tag generation circuit 238B can generate a tag 242C with data from the array 234, and thus serve to authenticate the array data 234. A tag 242C can be transmitted with encrypted data 236 to a host device.

Referring still to FIG. 2C, authentication op circuits 220C of a corresponding host device can include decryption circuits 220-0, tag evaluation circuits 244C, and tag generation circuits 238C. A decryption circuit 220-0 can take the form of that described for FIG. 2A, or an equivalent. Tag generation circuit 238C can receive decrypted data 232 and generate a compare tag 246C. Tag evaluation circuits 244C can compare a received tag 242C to compare tag 246C to derive an authentication result 248. Authentication result 248 can be used to authenticate the transaction data (e.g., read data).

In this way, encrypted read data and tag can provide data authentication in memory device transaction.

Figure 2D:
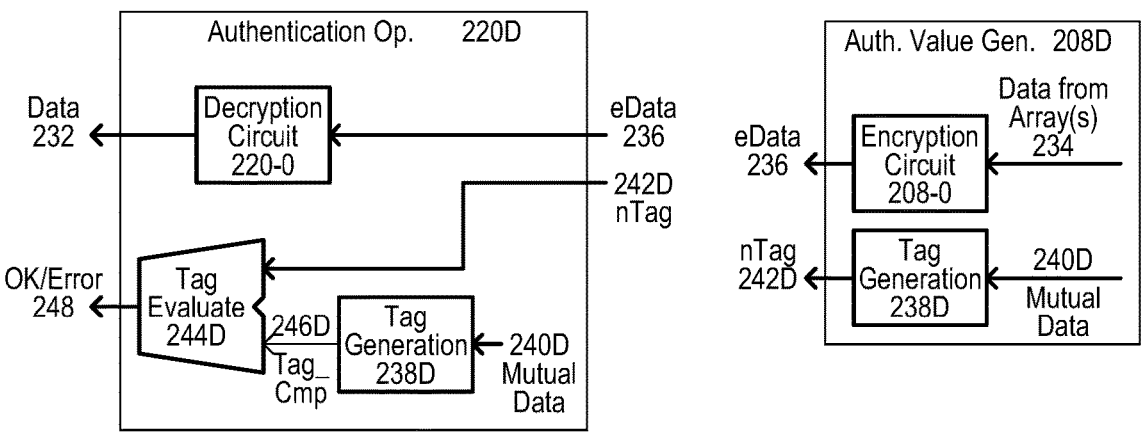

FIG. 2D shows an authentication configuration which can provide encrypted read data and a corresponding tag that can authenticate the memory device. Authentication circuits 208D can include an encryption circuit 208-0, which can take the form of that described for FIG. 2A or an equivalent, and a tag generation circuit 238D. Tag generation circuit 238D can generate a tag 242D with device identification data 240D, that can be data mutually known or derived by a corresponding host device. A tag 242D can be transmitted with encrypted data 236 to a host device.

Referring still to FIG. 2D, authentication op circuits 220D of a corresponding host device can include decryption circuits 220-0, tag evaluation circuits 244D and tag generation circuits 238D. A decryption circuit 220-0 can take the form of that described for FIG. 2A, or an equivalent. Tag generation circuit 238D can generate a compare tag 246 with mutually known device identification data 240D. Tag evaluation circuits 244D can compare a received tag 242C to compare tag 246D to derive an authentication result 248. Authentication result 248 can be used to authenticate the transaction as corresponding to the expected memory device.

In this way, a transaction can be authenticated with encrypted data and a tag that authenticates the memory device.

Figure 2E:
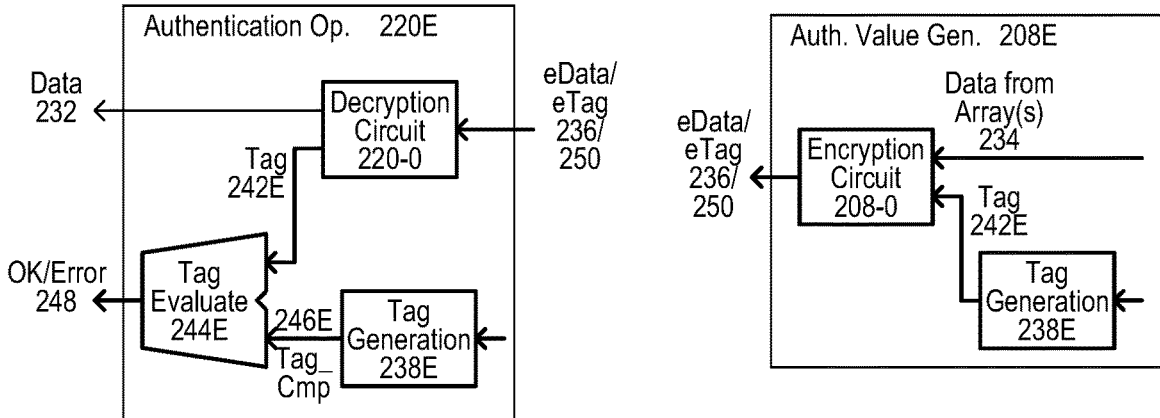

FIG. 2E shows an authentication configuration which can provide encrypted read data and an encrypted tag. Authentication circuit 208E can include an encryption circuit 208-0 and tag generation circuit 238E. Encryption circuit 208-0 can take the form of that described for FIG. 2A or an equivalent. However, encryption circuit 208-0 can encrypted by data from array(s) 234 as well as a tag 242E. A tag generation circuit 238E can generate a tag 242E, which can be encrypted by encryption circuit 208-0 to generate an encrypted tag 250. Encrypted tag 250 can be transmitted with encrypted data 236 to a host device.

Referring still to FIG. 2E, authentication op circuits 220E of a corresponding host device can include decryption circuits 220-0, tag evaluation circuits 244E and tag generation circuits 238E. A decryption circuit 220-0 can take the form of that described for FIG. 2A, or an equivalent. However, decryption circuits 220-0 can decrypt an encrypted tag 250 in addition to decrypted data 236. Tag generation circuit 238E can generate a compare tag 246E in the same manner as that within authentication circuit 208E.

Tag evaluation circuits 244E can compare a decrypted tag 242E to compare tag 246E to derive an authentication result 248. An authentication result 248 can authenticate read data, the memory device or both, depending upon how the tag 242E was generated.

In this way, a transaction can be authenticated with encrypted data and an encrypted tag, which can further authenticate the data and/or the device.

Figures 2F, 2G:
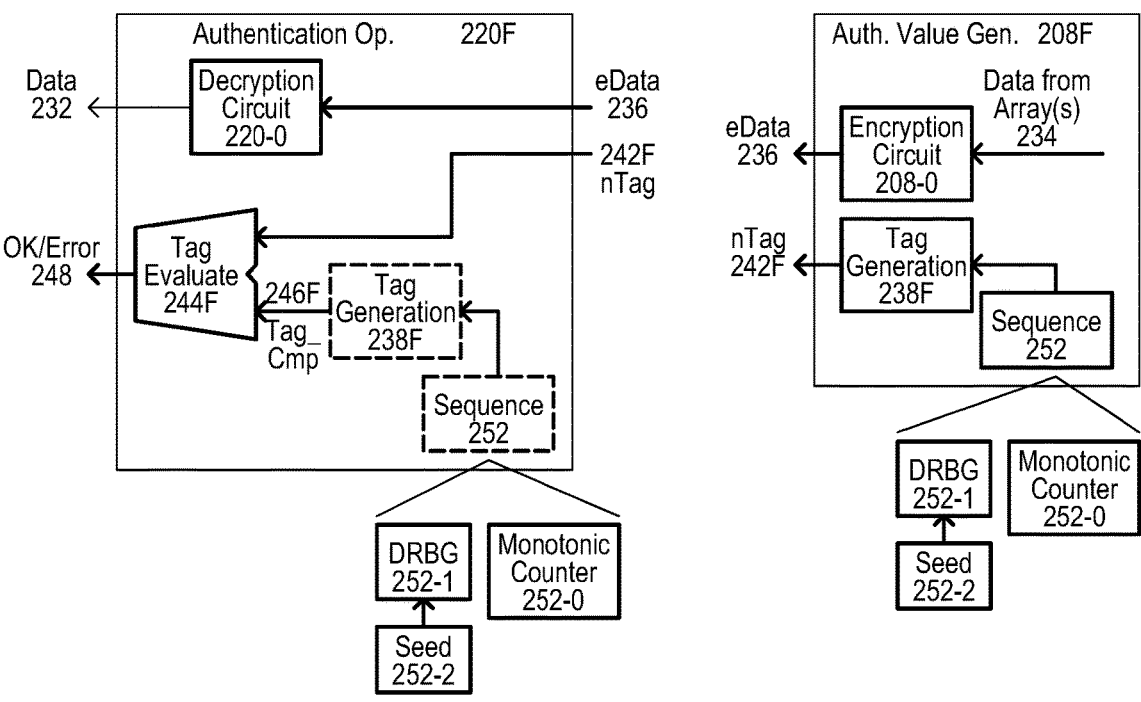

FIG. 2F shows an authentication configuration which can provide encrypted read data and a tag that can authenticate the transaction. An authentication circuit 208F can include an encryption circuit 208-0 can take the form of that described for FIG. 2A or an equivalent, and tag generation circuit 238F. A tag generation circuit 238F can generate a tag 242F from a sequence value 252 which can change with each transaction. A sequence value 252 value can be generated in any suitable fashion, including but not limited to a monotonic counter 252-2 or a deterministic random bit generator (DRBG) 252-1. A DRBG 252-1 can initiate a sequence with a seed value 252-2. Tag 242F can be transmitted with encrypted data 236 to a host device.

Referring still to FIG. 2F, authentication op circuits 220F of a corresponding host device can include decryption circuits 220-0 and tag evaluation circuits 244F. Tag evaluation circuit 244F can evaluate a received tag 242F to generate an authentication result 248. In some embodiments, such an evaluation may include comparing a tag value (e.g., count) to one or more limits that indicate a proper sequence (e.g., higher count than previous transaction). Optionally, authentication op circuits 220F can include tag generation circuits 238F that can generate a compare tag 246F from a sequence 252 generated in the same fashion as authentication circuits 208F.

In this way, a transaction can be authenticated by encrypted read data and a tag generated with a number from a non-repeating sequence.

FIG. 2G shows an authentication configuration which can provide encrypted read data, a tag that can authenticate the transaction, and a tag that can authenticate the data. An encryption circuit 208-0 can take the form of that described for FIG. 2A or an equivalent. A first tag generation circuit 238-0 can generate a tag 242-0 from array data. A second tag generation circuit 238-1 can generate a tag 242-1 from device information. Tags 242-0/1 can be transmitted with encrypted data 236 to a host device.

Referring still to FIG. 2G, authentication op circuits 220G of a corresponding host device can include decryption circuits 220-0, first tag evaluation circuit 244-0, second tag evaluation circuit 244-1, first tag generation circuit 238-0 and second tag generation circuit 238-1. Decryption circuit 220-0 can provide decrypted read data 232 to first tag generation circuit to generate a first compare tag 246-0. Second tag generation circuit 238-1 can generate a second compare tag 246-1 with mutually known device data 240G. First tag evaluation circuit 244-0 can compare a received first tag to a first compare tag to generate a result 248-0 which can authenticate the read data. Second tag evaluation circuit 244-1 can compare a received second tag to a second compare tag to generate a result 248-1 which can authenticate the memory device.

In this way, a transaction can be authenticated with encrypted read data, a first tag that authenticates the data, and a second tag that authenticates the memory device.

It is understood that the various tags and authentication values shown in FIGS. 2A to 2G can be per transaction values, not single-event time authentication values, such as those generated on power-on or reset. Further, the various authentication approaches shown can be intermixed (e.g., non-encrypted tags can be encrypted, tags can be transmitted with non-encrypted read data). It is also understood that the various authentication configurations of FIGS. 2A to 2G are provided by way of example and should not be construed as limiting.

In some embodiments, authentication circuits and systems described herein can generate tags of a certain size (e.g., number of bits). However, it may be desirable to have a smaller tag size to reduce a number of bits transmitted in a transaction. In some embodiments, initial authentication values can be truncated to generate tags for transmission. FIGS. 3A and 3B are diagrams showing authentication value truncation according to embodiments.

FIG. 3A is a truncation circuit 356A according to an embodiment. A truncation circuit 356A can include an authentication circuit 308 that generates an initial tag 342I in any suitable manner as described herein or an equivalent. This includes generating an initial tag value 342I using read data 334 and/or mutual data 340, or both. An initial tag 342I can have a size of "N" bits. The N-bits can be truncated 358 to a smaller bit value 342 (shown as "M" bits).

FIG. 3B is a truncation circuit 356B according to another embodiment. A truncation circuit 356B can include an authentication circuit 308, a cyclic redundancy code (CRC) generator 358-0 and an XOR circuit 358-1. Authentication circuit 308 can operate as in the case of FIG. 3A. A CRC generator 358-0 can generate a CRC 358-2 of N bits from the read data 334, where N>M. XOR circuit 358-1 can execute a XOR operation on CRC 358-2 and an M-bit portion of the initial tag 342I. The M-bit portion of the initial tag 342I can be contiguous or not contiguous. An output of the XOR gate 358-2 can be a truncated tag value 342.

A truncation size can be any suitable value to meet transmission/security requirements. Truncation circuits 356A/B can take any suitable form, including logic circuits, instructions executed by processor(s) or combinations thereof.

In this way, per transaction authentication tags can be truncated versions of a larger authentication value.

In some embodiments, a memory device can return encrypted data with a separate tag in a transaction (e.g., read operation). FIGS. 4A to 4D are diagrams showing transaction data orders according to embodiments. In FIGS. 4A to 4D it is understood that a tag 442 can also be an encrypted tag. Further, encrypted data 436 may also be unencrypted data.

FIG. 4A shows how encrypted data 436 can be followed by a tag 442. In some embodiments, such an arrangement can occur when a tag 442 is generated with read data to authenticate the read data.

FIG. 4B shows how a tag 442 can precede encrypted data 436. In some embodiments, such an arrangement can occur when a tag 442 is generated without read data (e.g., the tag authenticates the device).

FIG. 4C shows how a tag can be interspersed with transaction data. In the embodiment shown, an output can include a first encrypted data portion 436-0, followed by a first tag portion 442-0, followed by a second encrypted data portion 436-1, followed by a second tag portion 442-1. However, other embodiments can include any other suitable interspersing of encrypted data portions with a tag (or tag portion) or tag portions with encrypted data (or encrypted data portions).

FIG. 4D shows how different tags can be output with encrypted data. In the embodiment shown, an output can include a first tag 442-A followed by encrypted data 436 followed by a second tag 442-T. In some embodiments, a first tag 442-A can authenticate a device while a second tag 442-T can authenticate the encrypted data. Alternate embodiments can include any other suitable order, or more than two tags.

In this way, embodiments can include different orders of transaction data and authentication tags.

Figures 5, 7A, 7B, 7C:
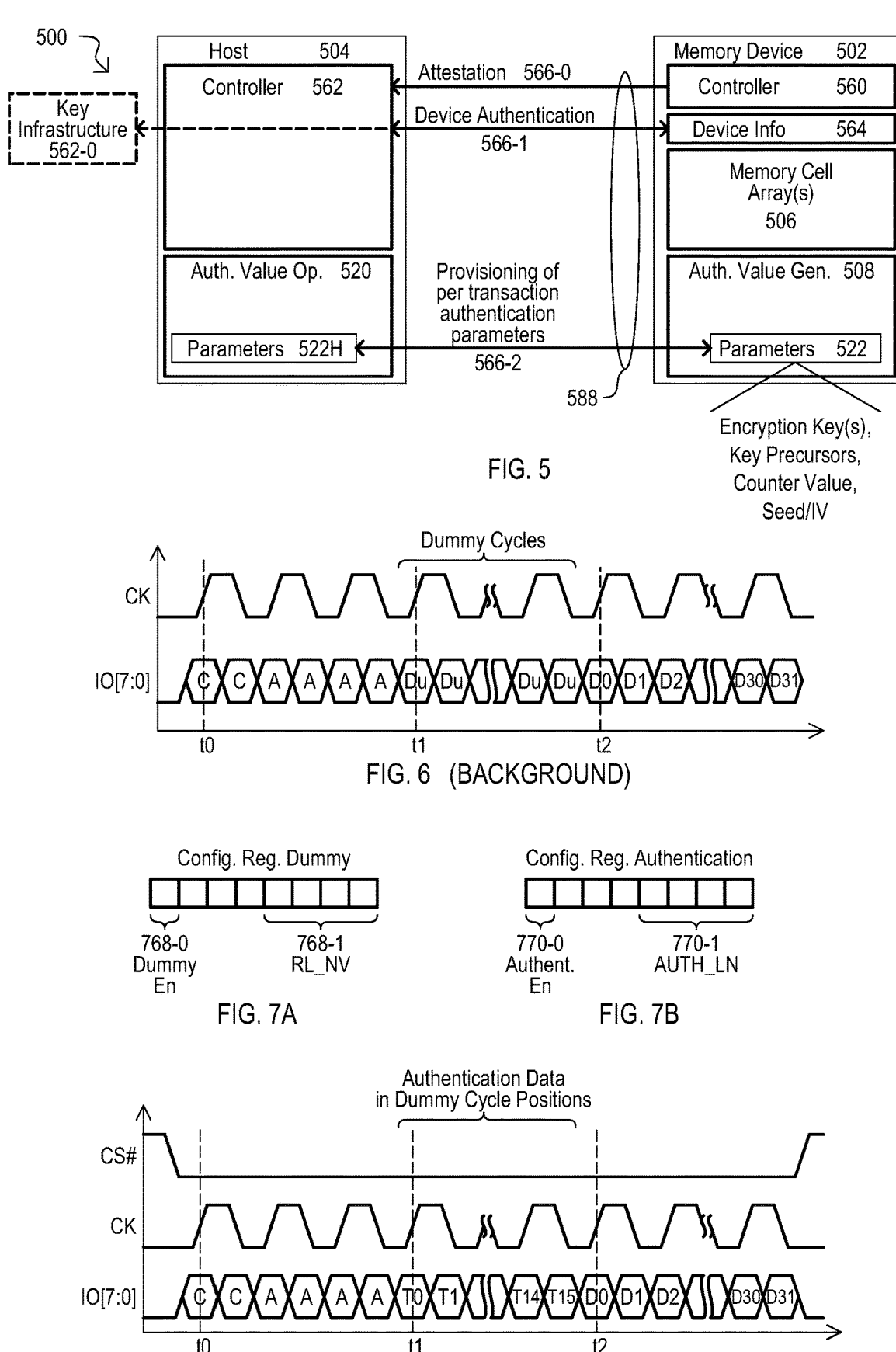
FIG. 5 is a block diagram showing provisioning operations according to an embodiment.
FIGS. 7A, 7B and 7C are diagrams showing authenticated read operations that can transmit authentication values in lieu of dummy cycles, according to embodiments.

In some embodiments, prior to engaging in authenticated transactions, a host device and memory device can establish authentication parameters in a provisioning or related operation. FIG. 5 is a block diagram showing a provisioning operation for a system 500 according to an embodiment. A system 500 can include a memory device 502 and host device 504 in communication over a bus 588. A memory device 502 can include controller circuits 560, device information 564, memory cell array(s) 506 and authentication circuits 508. A controller 560 can control operations of memory device 502. Device information 564 can identify a memory device 502, and in some embodiments, can be stored in a secure storage location by a manufacturer. Memory cell array(s) 506 can store data accessed in secure transactions by a host device 504. Authentication circuits 508 can take the form of any of those described herein or equivalents, generating authentication values based on authentication parameters 522. Authentication parameters 522 can take the form of any of those described herein or equivalents, including but not limited to encryption keys, key precursors, counter values, seed values or initial values.

A host device 504 can include a host controller 562 and authentication ops circuit 520. A host controller 562 can control operations of a host device. Authentication op circuits 520 can take the form of any of those described herein or equivalents, including executing authentication operation with parameters 522H corresponding to those of memory device 502.

A bus system 588 can include one or more signal lines, including unidirectional and/or bi-directional signal lines.

In some embodiments, a memory device 502 can identify itself with an attestation operation 566-0. Such an action can include memory device 502 transmitting one or more predetermined messages or signals on bus system 588.

In some embodiments, a host device 504 and memory device 502 can execute a device authentication operation 566-1. Such an action can include a host device 504 and memory device 502 exchanging data. In some embodiments, a host controller 562 can access a public or private key infrastructure 562-0. Once a host device 504 has authenticated the memory device 502, a host device 504 and memory device 502 can communicate to establish per transaction authentication parameters 522/522H.

While FIG. 5 shows an operation in which per transaction parameters can be established by communications between devices, in other embodiments such parameters can be established by manufacturers.

In this way, a memory device can execute a provisioning step with another device to establish per transaction authentication parameters.

According to some embodiments, authentication values can be transmitted in time periods corresponding to a memory cell access time (e.g., dummy cycles). Such operations can be advantageous for device authentication values that do not require read data.

To better understand features of the embodiments, a conventional memory operation will be described with reference to FIG. 6. FIG. 6 is a timing diagram showing a conventional NOR memory access operation and includes waveforms for a clock signal CK and command-address-data bus (IO[7:0]).

Referring to FIG. 6, at time t0, a read command (C) followed by address data (A) can be received by a memory device via a bus. At time t1, due to a built-in latency resulting from the time the access read data, a number of "dummy" cycles may occur before the read data are output on the bus. Such dummy cycles are represented by "Du" in FIG. 6. In some devices, the number of dummy cycles can be established by a configuration register and can vary according to clock speed. However, there is always a minimum number of dummy cycles due to the time for circuits to access stored data. At time t2, read data corresponding to the read command can be output, shown as D0 to D31.

FIG. 7A is a diagram of a dummy cycle configuration register that can be included in embodiments. While a number of dummy cycles 768-1 can be established in a conventional manner, the register may also disable dummy cycles 768-0 to enable authentication data to be transmitted in such a time period.

FIG. 7B is a diagram of an authentication configuration register that can be included in embodiments. Such a register can control if authentication data can precede transaction data in a time period conventionally reserved for dummy cycles. In the embodiment shown, a register setting 770-0 can enable or disable such authentication values, and a register setting 770-1 can establish the number of cycles authentication data can occupy.

FIG. 7C is a timing diagram showing authentication data transmitted in lieu of dummy cycles according to an embodiment. Prior to time t0, a CS # signal can transition active (in this embodiment low). At time t0, a read command (C) followed by address data (A) can be received on a bus. At time t1, authentication data (tag) can be transmitted (shown as T0 to T15). As noted herein, in some embodiments, such a tag can be a device authentication value that can be generated upon receipt of command data (C), as a read address and read data are not needed to generate the tag. At time t2, following the authentication tag, read data corresponding to the read command can be output, shown as D0 to D31. While FIG. 7C shows a tag value being transmitted in the cycle immediately following a last address value, in other embodiments there may be one or more dummy cycles between an address value (A) and a first tag value (TO). It is noted that CS # can remain active throughout the transaction.

In this way, embodiments can transmit a transaction authentication value in a time period corresponding to a read latency.

In some embodiments, per transaction authentication can be enabled or disabled in a memory device. In some embodiments, a memory device can be placed into a mode of operation in which certain transactions (e.g., read operations) are always authenticated. Alternatively, a memory device can interpret a command set to distinguish between standard (i.e., not authenticated) transactions and authenticated transactions. FIGS. 8A to 8E are diagrams showing memory device operations that can distinguish between authenticated and non-authenticated transactions.

FIG. 8A is a block diagram showing authentication circuits 808 of memory device according to an embodiment. Authentication circuits 808 can receive data from array(s) 834. A no authentication path 808B can allow data 832 to be output without any authentication value. An authentication value generator path 808A can be enabled by an enable signal 872, and in response, can generate an authentication value (e.g., encrypted data and/or tag).

FIG. 8B shows an authentication mode select circuit 874B according to an embodiment. Circuit 874B can include a configuration registers 876-0 and configuration data decoder 876-1. A configuration register 876-0 can include registers for configuring various operations of a memory device, including an authentication register 876-2. Configuration data decoder 876-1 can generate an enable signal 872 in response to data in authentication register 876-2.

FIG. 8C is a table showing an example of a device configuration register set 876-0. A register set 876-0 can control various operations of a memory device and can be accessed at a register address (XXXXh). Bit values written into the register 876-2 can establish variables for the authentication operations.

In this way, once an authentication register has been programmed, all transactions of a certain type (e.g., read operations) can be authenticated according to any of the techniques described herein.

Figures 8D, 8E:
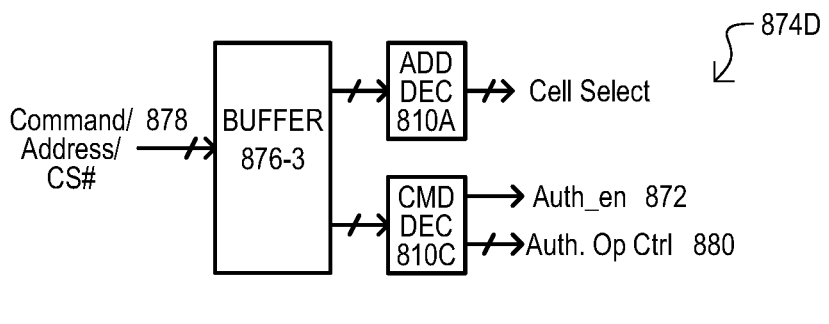

FIG. 8D shows an authentication mode select circuit 874D according to another embodiment. Circuit 874D can include a command/address buffer 876-3, an address decoder 810A and command decoder 810C. Command/address buffer 876-3 can receive command and/or address data, as well as a CS signal, at an interface 878. Provided CS signal is active, address decoder 810A can decode address values to select memory cells (or registers). Command decoder 810C can decode commands, including commands for authenticated operations. Upon decoding a command that includes authentication, command decoder 810C can activate an authentication enable indication 872 and control signals 880 for authentication operations (e.g., authentication circuits).

FIG. 8E is a table showing how a memory device with a serial interface 878 can process standard commands, including but not limited to: a read command (READ), fast read command (FAST_READ), page program command (PP) and a sector erase command (SE). Such standard commands can have corresponding authenticated counterpart commands 882-0 to 882-2, which can result in the generation authentication values for the operation as described herein.

In this way, in response to specific received commands, a memory device can authenticate a corresponding transaction.

Embodiments can include memory devices that provide per transaction authentication of any suitable configuration. While such embodiments can include devices compatible with a bus that can carry command, address and data values, other embodiments can be compatible with buses that have a data bus separate from an address bus.

FIG. 9A is a block diagram of a memory device 902 according to another embodiment. A memory device 902 can include NVM cell arrays 906, a first IF 978S and a second IF 978D. NVM cell arrays 906 can include NVM cells for storing data that can be accessed in a read transaction. A first IF 978S can be a serial interface with connections for a data bus SPI_DQ that can carry command, address and data. A first IF 978S can further receive a chip select signal SPI_CS and timing clock SPI_CK. In some embodiments, a first IF 978S can be compatible with one or more SPI standards.

A second IF 978D can include connections for a command address (CA) bus that can carry command and address values, and connections for a data bus (DQ) over which data (e.g., read data, write data) can be transmitted. A CA bus can be unidirectional. A DQ bus can be bi-directional. A second IF 978D can also provide a data strobe signal DQS for timing output data and receive a chip select signal CS and clocks signal CK. A second IF 978D can include authentication circuits for providing authentication values at a data bus DQ for authenticating transactions with memory device 902. In some embodiments, a second IF can be compatible with one or more LPDDR standards.

FIG. 9B is a table showing one example of an authenticated read command 982 compatible with an LPDDR4 interface. Such an authenticated read command 982 can be processed by an interface like that shown as 978D in FIG. 9A. An authenticated read command 982 can include bits provided when a CS signal is high (H) and when CS is low (L). The particular bit values (CA0 to CA6) can be decoded by a command decoder to indicate an authenticated read operation.

FIG. 9C is a timing diagram of a read operation according to an embodiment. Such a read operation can be executed by a memory device like that shown in FIG. 9A. At time t0, activation commands (ACT1/ACT2) can be received, followed by an authenticated read command 982-0C, which can be followed by a CAS command 982-1C. In response to such command data, at time t1, a memory device can output authentication values (T). In some embodiments, authentication values can be output after a read latency 981. If an authentication value (T) is a device authentication value, a read latency 981 can be less than that of a standard read command. However, in other embodiments an authentication value (T) may not be a separate tag, but the encrypted read data itself. Further, an authentication tag can be output after corresponding encrypted read data.

FIG. 9D is a timing diagram of a read operation according to another embodiment. Such a read operation can be executed by a memory device like that shown in FIG. 9A. At time t0, fast authenticated read commands (NVM1A/NVM2A) can be received. In response to such command data, a memory device can output authentication values (T). The form and timing of such authentication values can vary in the same manner as for FIG. 9C.

Figures 9E, 9F:
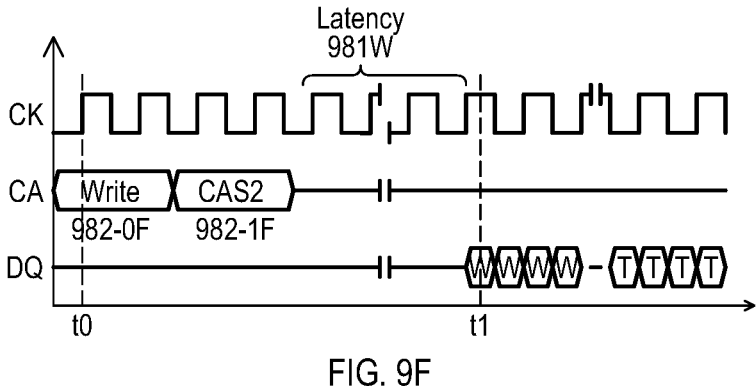

FIG. 9E is a table showing one example of an authenticated write command 982W compatible with an LPDDR4 interface. Such an authenticated write command 982W can be processed by an interface as described for FIG. 9B, or an equivalent.

FIG. 9F is a timing diagram of a write operation according to an embodiment. Such a write operation can be executed by a host device for a memory device like that shown in FIG. 9A. At time t0, authenticated write commands (Write/CAS2) can be received. At time t1, write data (W) can be received, followed by authentication values (T) corresponding to the write operation. The form and timing of such authentication values can vary in the same manner as for FIG. 9C.

It is understood that commands shown in FIGS. 9B to 9F can be commands issued while in an authenticated mode or authenticated commands that can be decoded differently than standard read commands.

In this way, a memory device can provide per transaction authentication values on a data bus in response to commands received on a command address bus.

Figure 10A:
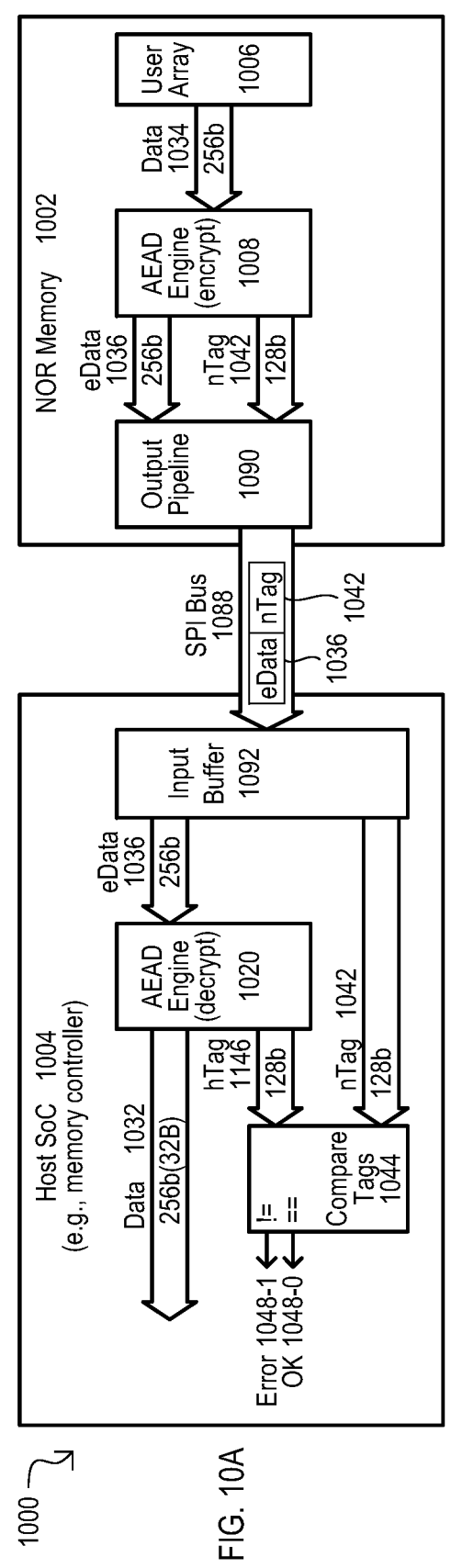
FIGS. 10A and 10B are diagrams showing a system and operations for transactions having both device and data authentication according to embodiments.
Figure 10B:
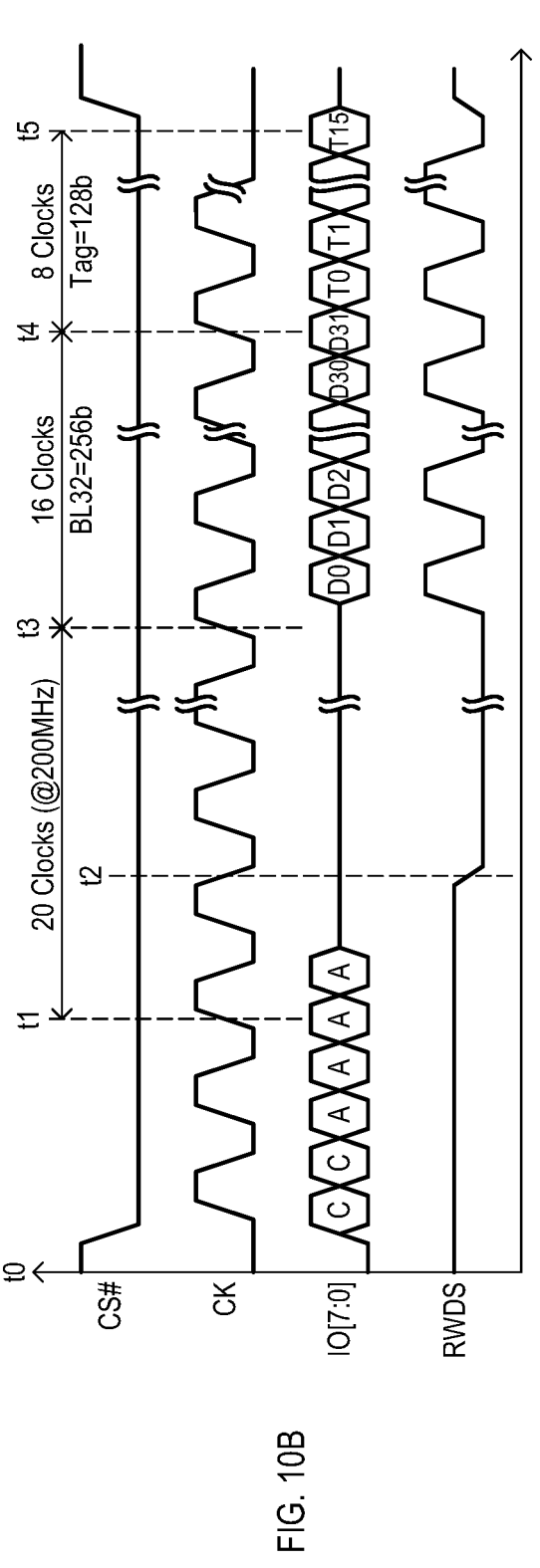

FIGS. 10A and 10B are diagrams showing a system and operations with authenticated transactions according to another embodiment. FIG. 10A shows a system 1000 that includes a memory device 1002, host device 1004 in communication over a SPI Bus 1088. A memory device 1102 can be a NOR type NVM device that includes a user array 1006, an authentication circuit 1008 and an output pipeline 1090. A user array 1006 can include NOR type NVM cells accessible by addresses. An authentication circuit 1008 can be an authenticated encryption with associated data (AEAD) engine.

A host device 1004 can be a system-on-chip device having memory controller functions for controlling memory device 1002. A host device 1004 can include an input buffer 1092, authentication op circuits 1020 and evaluation circuits 1044. Input buffer 1092 can receive encrypted read data and tags from a memory device 1002. Authentication op circuits 1020 can include an AEAD decryption engine.

An operation of system 1000 will now be described. In response to a command from a host device 1004, a memory device 1002 can retrieve target data 1034 from a user array 1006. In the embodiment shown, such target data can be accessed amounts corresponding storage (e.g., cache lines) of host device 1004, which in the embodiment shown can be 32 bytes. Target data 1034 can be processed by an AEAD engine 1008, which can generate an authentication tag 1042 corresponding to the target data 1034. Optionally, AEAD engine 1008 can generate encrypted data (i.e., cyphertext) 1036.

In the embodiment shown, encrypted data 1036 (or optionally unencrypted data) can be a 256b value. The corresponding tag 1042 can be a 128b value. In some embodiments, encrypted data 1036 can be available prior to the tag value 1042. An output pipeline 1090 can organize encrypted (or unencrypted) data 1036 and tag values 1042 for output from NOR memory 1002.

(Un)encrypted data 1036 and tag 1042 can be transmitted on SPI bus 1088 and received by input buffer 1092 of host device 1004. AEAD decryption engine 1020 can generate a compare tag 1146, and optionally, decrypt encrypted data 1036 to provide input data 1032. Evaluation circuits 1044 can compare a generated tag 1146 with a received tag 1042. If such tags are equal (==), a valid indication 1048-0 can be generated, and the input data 1032 can be released to its destination (e.g., processor or cache location). If such tags are not equal (!=), an error indication 1048-1 can be generated, indicating the input data 1032 has not been authenticated.

FIG. 10B is a timing diagram showing an operation like that shown in FIG. 10A. At about time t0, a chip select signal CS # can be activated, and command and address data from host device 1004 can be transmitted on SPI bus 1088. Time t1 can indicate a last clock cycle of address data. Following transmission of command and address data, at about time t2, a data strobe signal RWDS can be activated. Please note that SPI bus 1088, in FIG. 10A and other figures and their corresponding descriptions, is merely an example to illustrate one embodiment of the disclosure and should not be construed as a limitation. Other types of buses may be used to transmit data between host SoC 1004 and NOR memory 1002 in other embodiments.

At about time t3, data (which may be encrypted) for the transaction can be transmitted by memory device 1002. At about time t4, the tag corresponding to data can be output. At about time t5, a CS # signal can return to an inactive state, ending the transaction.

There can be a delay between a last clock cycle of address data (t1) and the presence of read data (which may be encrypted) on the SPI bus. In the embodiment shown, such a delay can include 20 clock cycles at clock speeds of 200 MHz. Data (which may be encrypted) can be output from a NOR memory 1002 over 16 clocks in a burst of 32 (i.e., at a double data rate). The tag can be transmitted over 8 clocks in a burst of 16.

In this way, a system can provide explicit device and data authentication, as a tag can authenticate the data, and the encryption keys used to generate the tag can authenticate the memory device.

Figure 11:
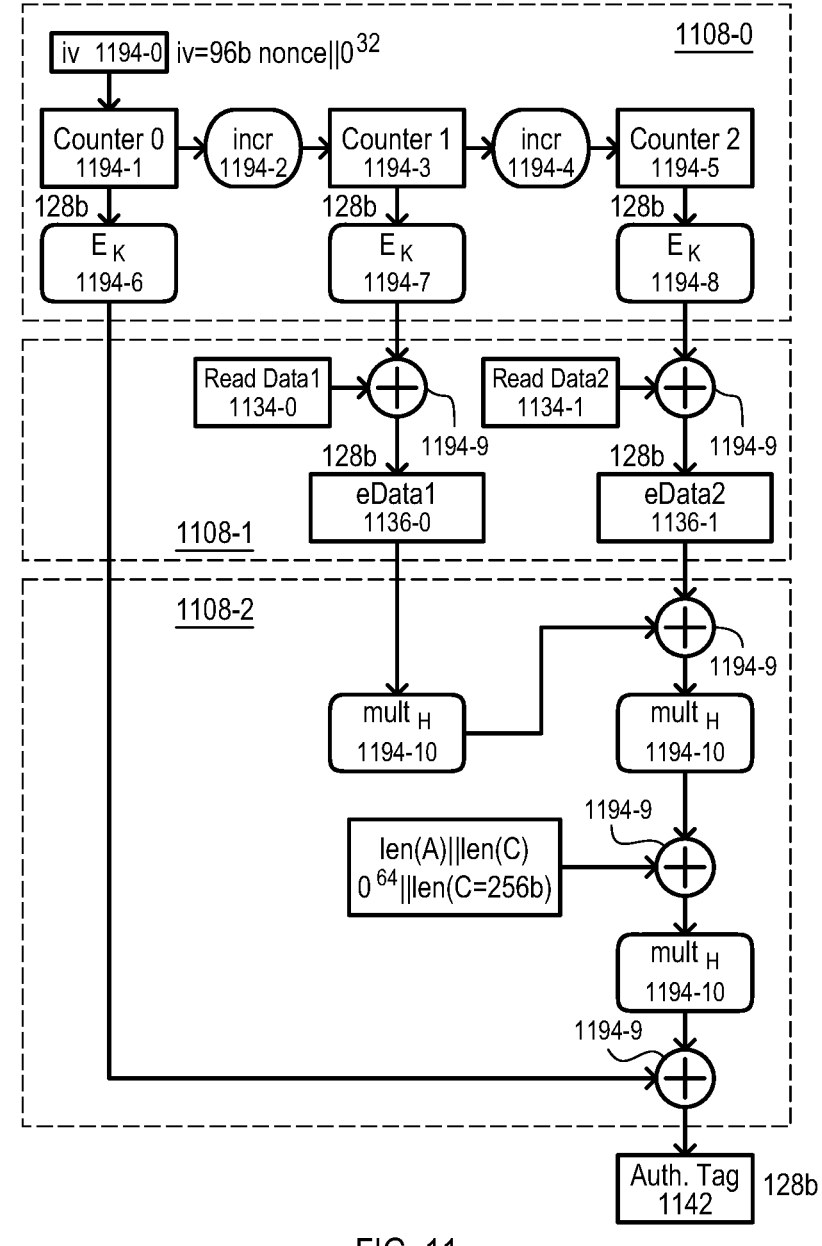
FIG. 11 is a block diagram of an authentication engine that can be included in embodiments.

FIG. 11 is a block diagram of an AEAD encryption engine 1108 that can be included in embodiments. An AEAD engine 1108 can include a pre-data section 1108-0, a data section 1108-1 and post-data section 1108-2. A pre-data section 1108-0 can generate values without the need for read (e.g., transaction) data. A pre-data section 1108-0 can start with an initial value 1194-0, which can be mutually established or otherwise known by a host device. An initial value 1194-0 can be applied to a first counter 1194-1, the output of which can be applied to incrementers 1194-2/4 and second and third counters 1194-3/5. Output from first, second and third counters 1194-1/3/5 can be applied to block cypher circuits 1194-6/7/8 which can encrypt the counter values according to a key K.

A data section 1108-1 can receive read data, which can be divided into two portions 1134-0/1. A first portion of read data 1134-0 can be XORed 1194-9 with the output of second block cypher 1194-7 to create a first portion of encrypted data 1136-0. A second portion of read data 1134-1 can be XORed 1194-9 with the output of third cypher block 1194-8. In some embodiments, encrypted data 1136-0/1 can be forwarded for output from the memory device.

A post-data section 1108-2 can include perform a Galois multiplication (mult$_H$) 1194-10 with a key dependent constant on first encrypted data 1136-0. The results can be XORed 1194-9 with second encrypted data 1136-1, and the results subject to another mult$_H$ operation 1194-10. Results of the mult$_H$ operation 1194-10 can be XORed 1149-9 with bit representations of the length of authenticated data len(A) concatenated with the length of the encrypted data len(E). The result can be subject to another mult$_H$ operation 1194-10, and the result can be XORed with the output of first block cypher 1194-6. The result can be the authentication tag 1142.

In this way, a memory device can execute portions of an authentication operation that do not require data, prior to or concurrent with, the read data being accessed. Further, if generation of an authentication tag utilizes encrypted read data, such encrypted read transaction data can be output prior to or concurrent with, the generation of the authentication tag.

According to embodiments, an authentication tag can be generated for a transaction, but can authenticate the device and not the data. In such a case, authentication operations can be performed in advance of the operation of the transaction.

Figures 12A, 12B:
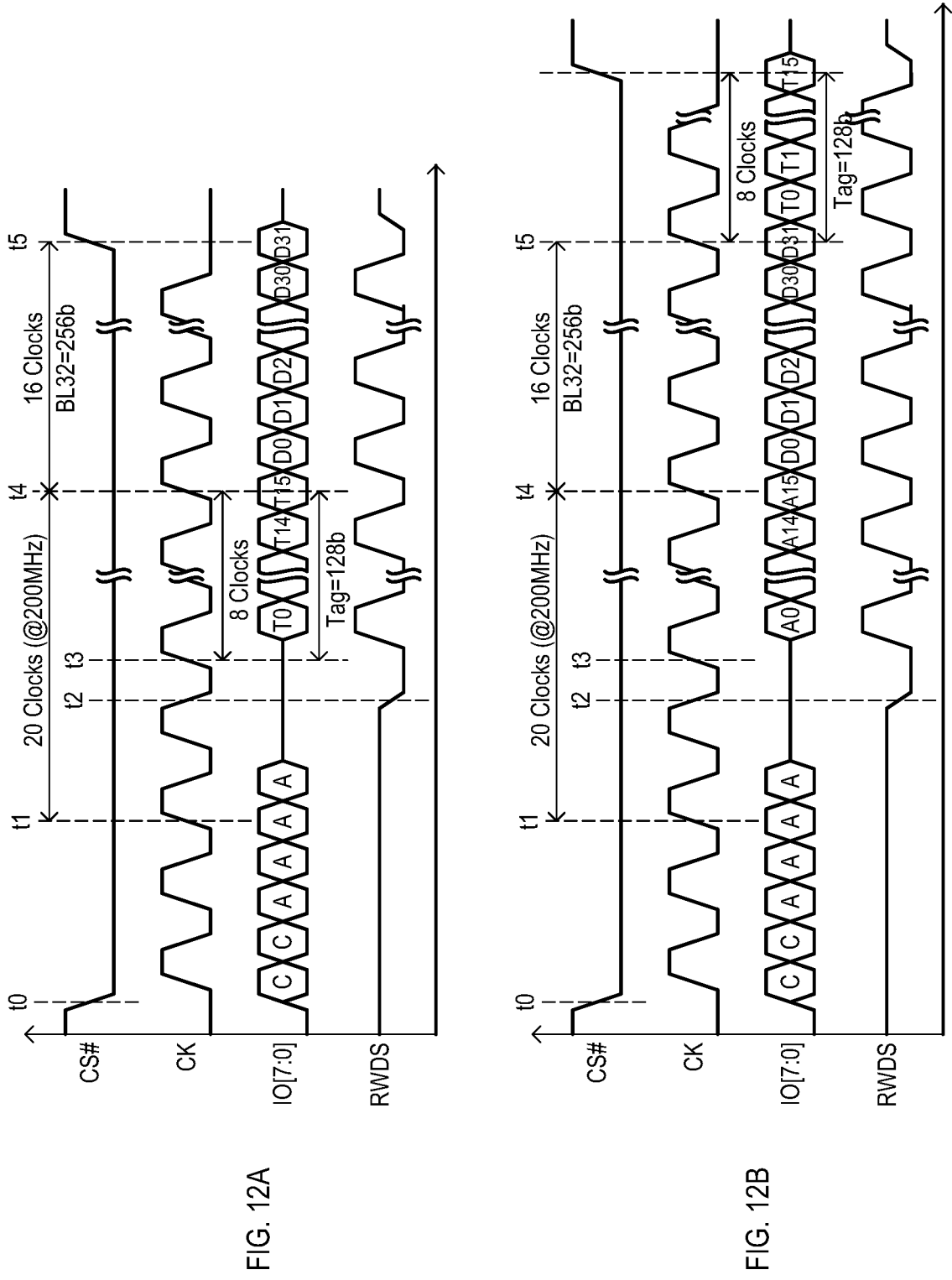
FIGS. 12A and 12B are timing diagrams showing device authentication operations and distributed device and data authentication operations according to embodiments.

FIG. 12A is a timing diagrams showing operation for a memory device that provides a tag that authenticates the device. The embodiment shown can include items like those shown in FIG. 10B. However, a tag (T0 to T15) can be output in the read latency period (e.g., between t1 and t4). In the embodiment of FIG. 12A, a tag can immediately precedes the read data (D0 to D15), which may or may not be encrypted.

Referring still to FIG. 12A, an authentication tag (T0 to T15) can be generated with any suitable method, using values and/or methods known to a receiving host device. In some embodiments, a memory device can include hash-based message authentication code (HMAC) circuits that can operate on mutually known values, such as a counter or DRBG, that can update with each new transaction. A CS # signal ensures the described operations occur in the same transaction.

In this way, a memory device can execute authentication operations on device data prior to or concurrent with, the read data being accessed. A resulting authentication tag can be output during a read data latency time.

FIG. 12B is a timing diagram showing operation for a memory device that provides different tag types distributed with transaction data. The embodiment shown can include items like those shown in FIG. 12A. However, in addition to a device authentication tag (A0 to A15) output in a read latency period, a data authentication tag (T0 to T15) can be output at time t5, after the read data (D0 to D15).

In this way, a memory device can distribute device and data authentication values with transaction data in an output stream.

Embodiments can use any suitable authentication/encryption techniques to provide authenticated transactions. A type of technique can depend on the speed of generating a result (e.g., clocks) as well as the level of security desired. FIG. 13 is a table showing various authentication/encryption techniques that can be included in embodiments. The table of FIG. 13 is provided by way of example and should not be construed as limiting.

FIG. 13 includes columns which show: type of cryptographic technique (Crypto), whether transaction data are encrypted (Data Encrypted), whether data are authenticated (Data Authenticated), whether the device is authenticated (Device Authentication), whether there is an initial latency added to the transaction (Initial Latency Adder) as well as examples of total latency added (Total Latency Adder).

Figures 19A, 19B:
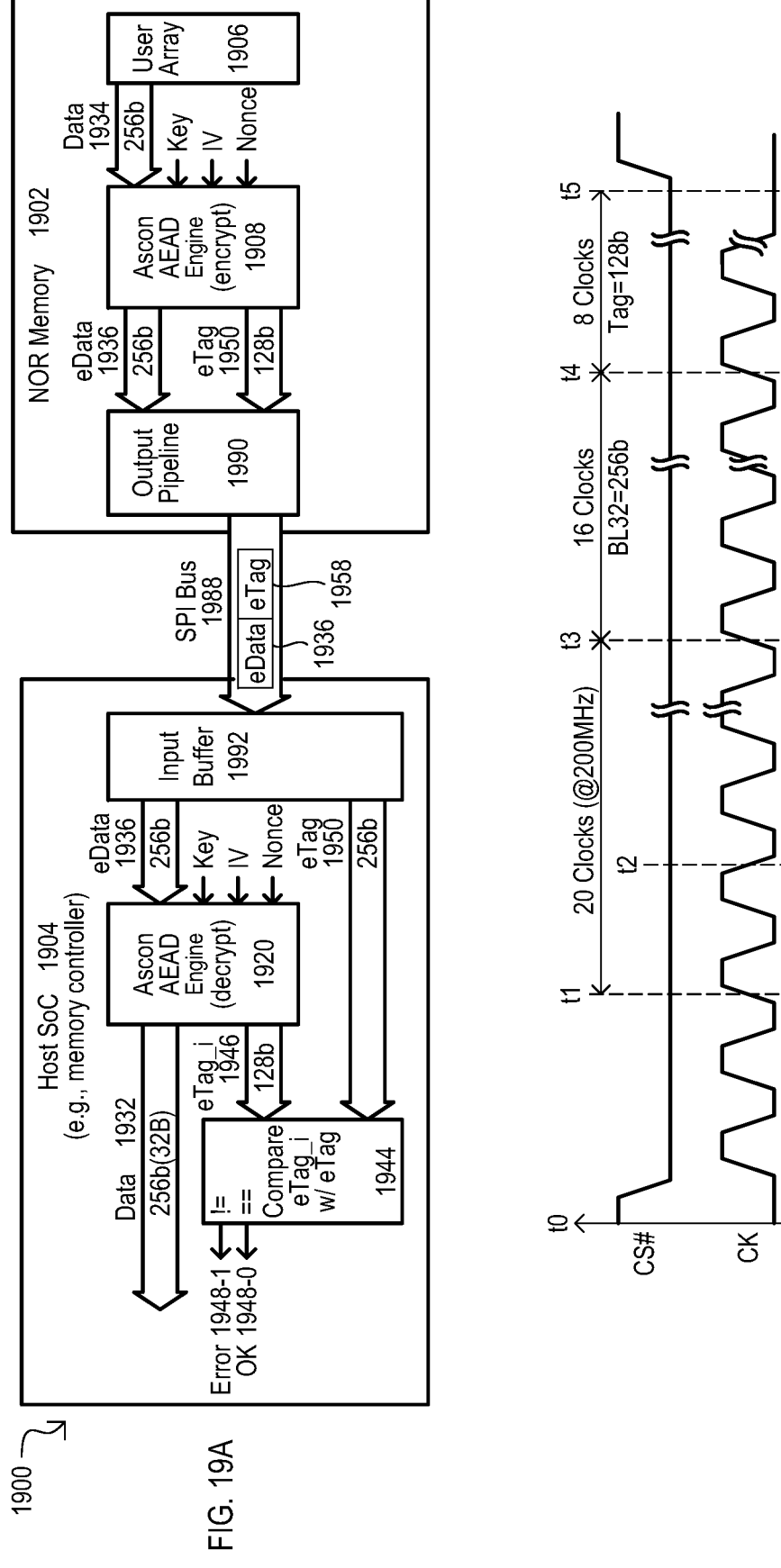
FIGS. 19A and 19B are diagrams showing a system with Ascon AEAD encryption according to embodiments.
Figure 19C:
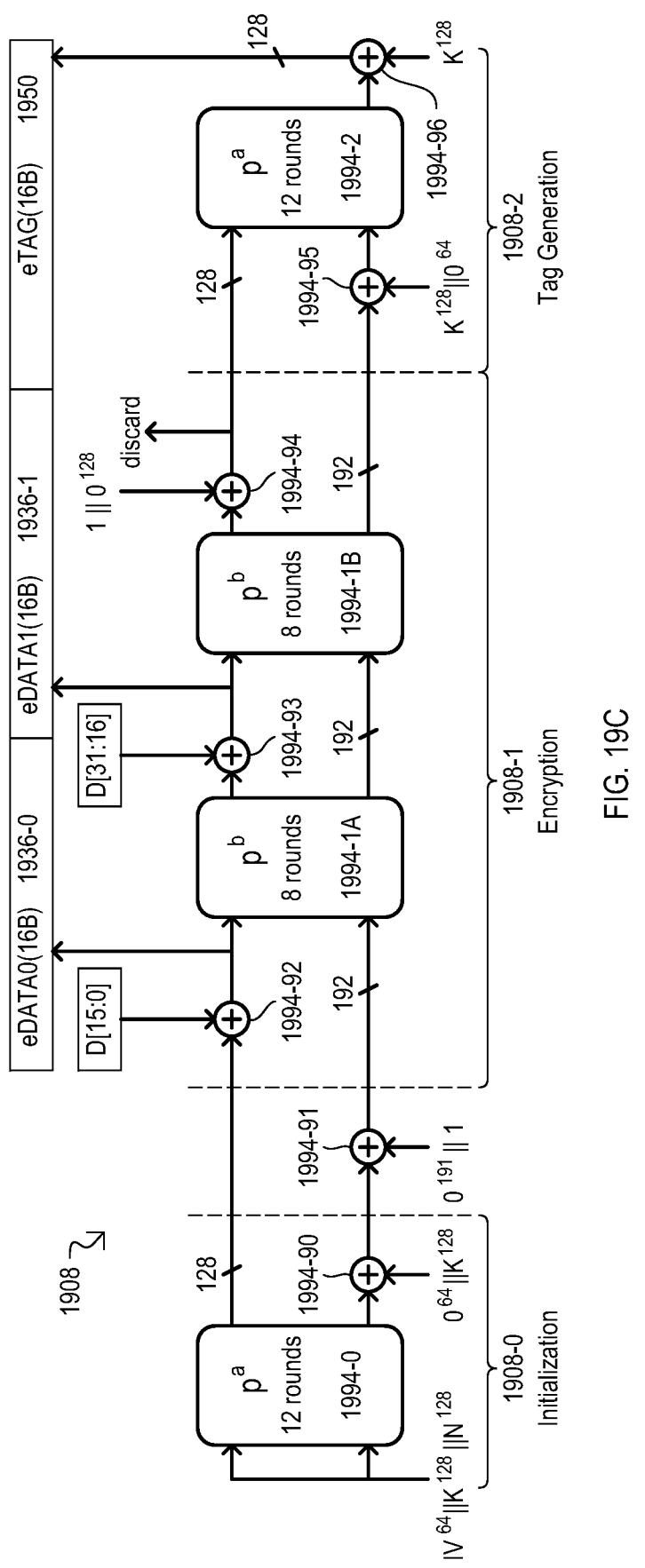
FIG. 19C is a block diagram of an Ascon type AEAD cypher system that can be included in embodiments.

Referring still to FIG. 13, the types of encryption/authentication can include Ascon AEAD, which can include operations like that shown in FIGS. 19A to 19C, and AES-GCM, which can include operations like that described for FIG. 11 or an equivalent. HMAC Data can include an HMAC operation on the transaction data to generate a tag. HMAC CRC can include an HMAC operation on a CRC generated from the transaction data to generate a tag. HMAC Counter can include an HMAC operation on a counter value, or other sequence value, to generate a tag. Encrypted CRC can include encrypting a CRC generated from the transaction data to generate a tag. Encrypted Counter can include encrypting a counter value, or other sequence value, to generate a tag. The various methods and values of FIG. 13 are provided by way of example and should not be construed as limiting.

In this way, authentication operations can generate authentication value according to any suitable manner according to the level of security desired and the amount of acceptable latency added to a transaction.

Figure 14A:
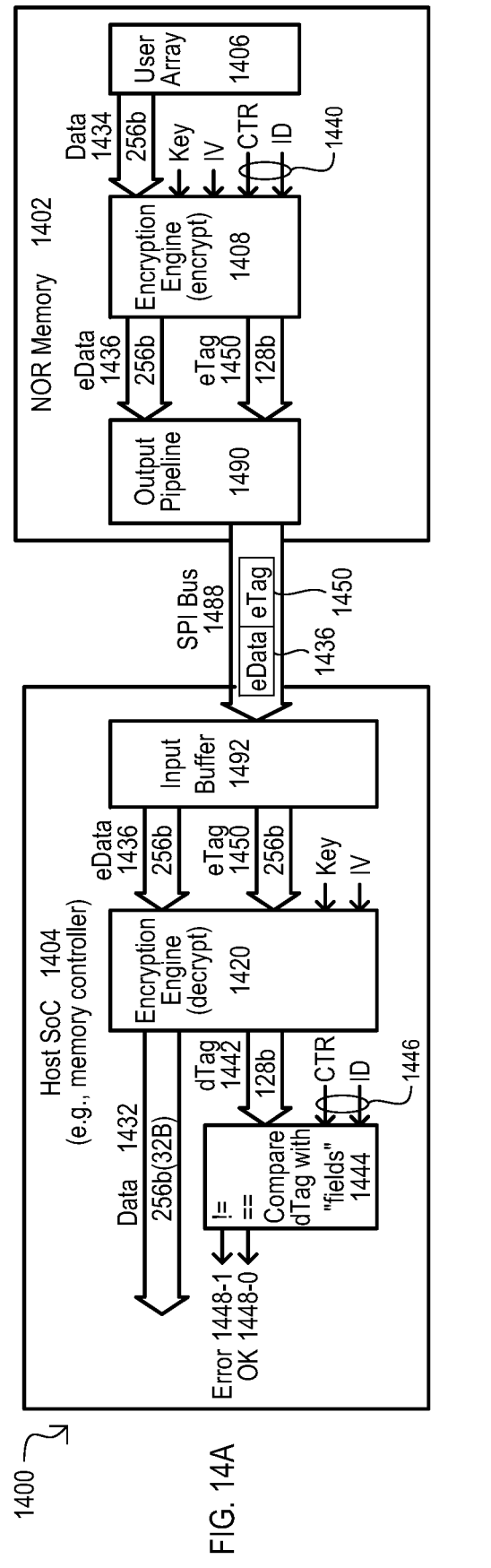
FIGS. 14A and 14B are diagrams of a system with device authentication and corresponding operations according to another embodiment.

FIG. 14A is a block diagram of a system 1400 according to a further embodiment. A system 1400 can include items like those of FIG. 10A, and such like items are referred to with the same reference character but with the leading digits being a "14" instead of "10".

FIG. 14A can differ from FIG. 10A in a number of ways. First, encryption and decryption engines can be different. In the NOR memory 1702, authentication circuit 1408 can be an encryption engine 1408 that, in addition to read data 1434, receives a key value, an initial value, a counter value (CTR) and another value (ID) which can be another identification value also known to a host device, such as a nonce.

In the host device 1404, a decryption circuit 1420 can receive encrypted data 1436 and an encrypted tag 1450 and execute decryption operations using a same key value and IV as used by NOR memory 1402. Decryption engine 1420 can output decrypted data 1432 and a decrypted tag 1442. A tag compare circuit 1444 can generate a compare tag using a same CTR value and ID value as NOR memory 1402, for comparison to the decrypted tag 1442. A result can be authentication failure 1448-1 or authentication success 1448-0. Please note that SPI bus 1488 is merely an example to illustrate one embodiment of the disclosure and should not be construed as a limitation. Other types of buses may be used to transmit data between host SoC 1404 and NOR memory 1402 in other embodiments.

Figure 14B:
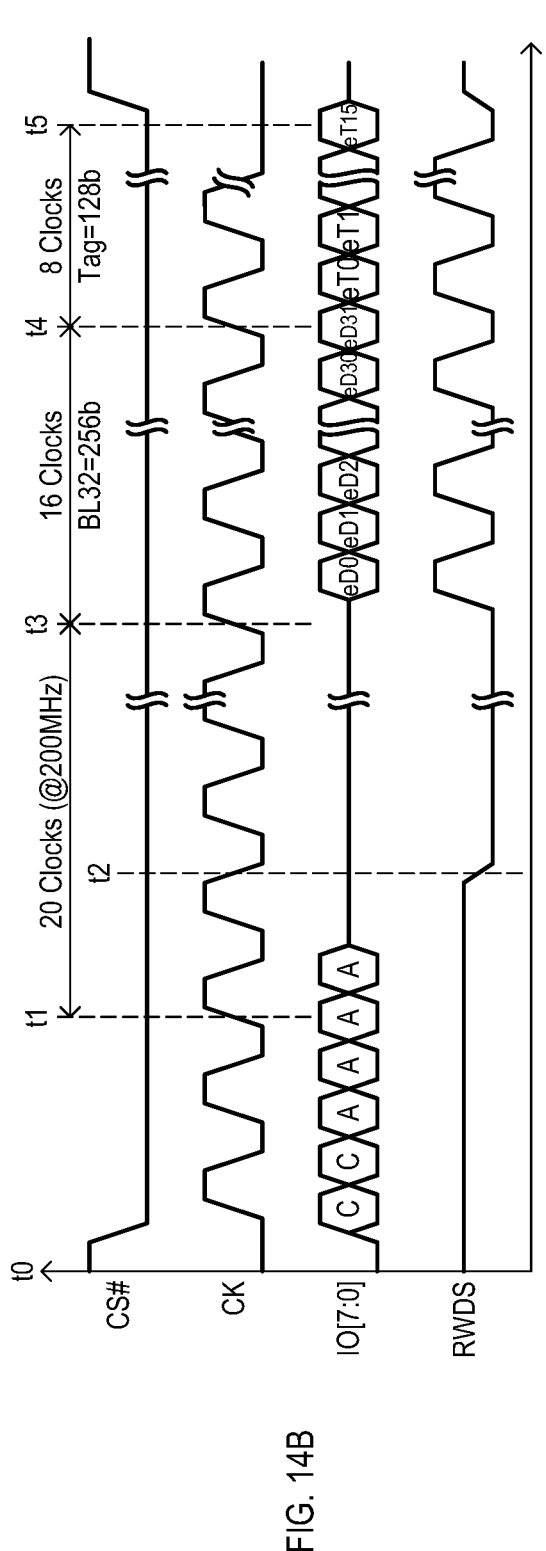

FIG. 14B is a timing diagram for showing operations for a system like that of FIG. 14A. FIG. 14B includes items like those of FIG. 10B, however, transaction data (eD0 to eD31) are encrypted, and the corresponding tag (eT0 to eT15) is encrypted. The illustrated operations can occur in a single transaction indicated by the active CS # signal in the embodiment shown.

In this way, authenticated memory device transactions can utilize an encryption engine to generate encrypted data and a corresponding tag.

Figures 15, 16, 17:
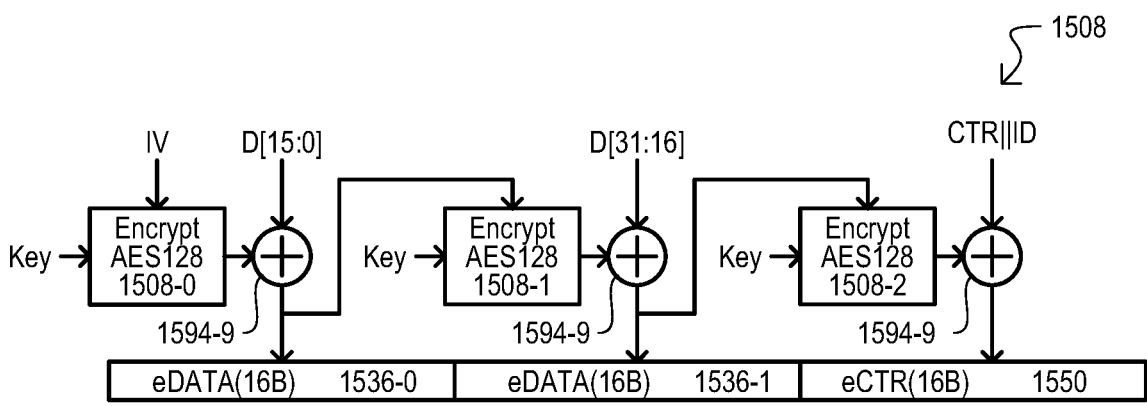
FIG. 15 is a block diagram of a cypher feedback mode that can be included authentication circuits according to embodiments.
FIGS. 16 and 17 are tables showing cypher feedback operations according to embodiments.

FIG. 15 is a block diagram showing an encryption engine 1508 that can be included in an embodiment like that of FIG. 14A. Encryption engine 1508 can operate in a cipher feedback mode and include block cipher operations 1508-0/1/2 and XOR operations 1594-9. In some embodiments, block cipher operations 1508-0/1/2 can be AES128 block encryption.

A first block cipher operation 1508-0 can encrypt an IV with a Key. The result can be XORed 1594-9 with a first data portion D[15:0] to generate first encrypted data 1536-0. The first encrypted data 1536-0 can be encrypted in a second cipher block operation 1508-1 with a key, and a result XORed 1594-9 with a second data portion D[31:16] to generate second encrypted data 1536-1. The second encrypted data 1536-1 can be encrypted in a third cipher block operation 1508-2 with a key, and a result XORed 1594-9 with mutual authentication values (CTR∥ID) to generate an encrypted tag (e.g., encrypted counter value) 1550. Mutual authentication values (CTR∥ID) can take the form of those described herein or equivalents.

FIG. 16 is a table showing the number or rounds in an AES block cipher operation based on key size. While embodiments can use keys of any suitable size, in some embodiments a smaller key size (128 bits) can be selected to reduce processing time.

FIG. 17 is a table showing the amount of processing time (i.e., clocks) for the various operations shown in FIG. 15. As shown, generating encrypted data and an encrypted tag can be completed in 13 clock cycles. It is understood that such timing is provided by way of example only. In other embodiments, authentication operations can be executed on a memory device circuits operating at a faster clock speed than that used to time data transmissions.

In this way, a memory device can include a cipher feedback mode to rapidly generate encrypted data and a corresponding encrypted tag in authenticated transactions.

Figures 18A, 18B:
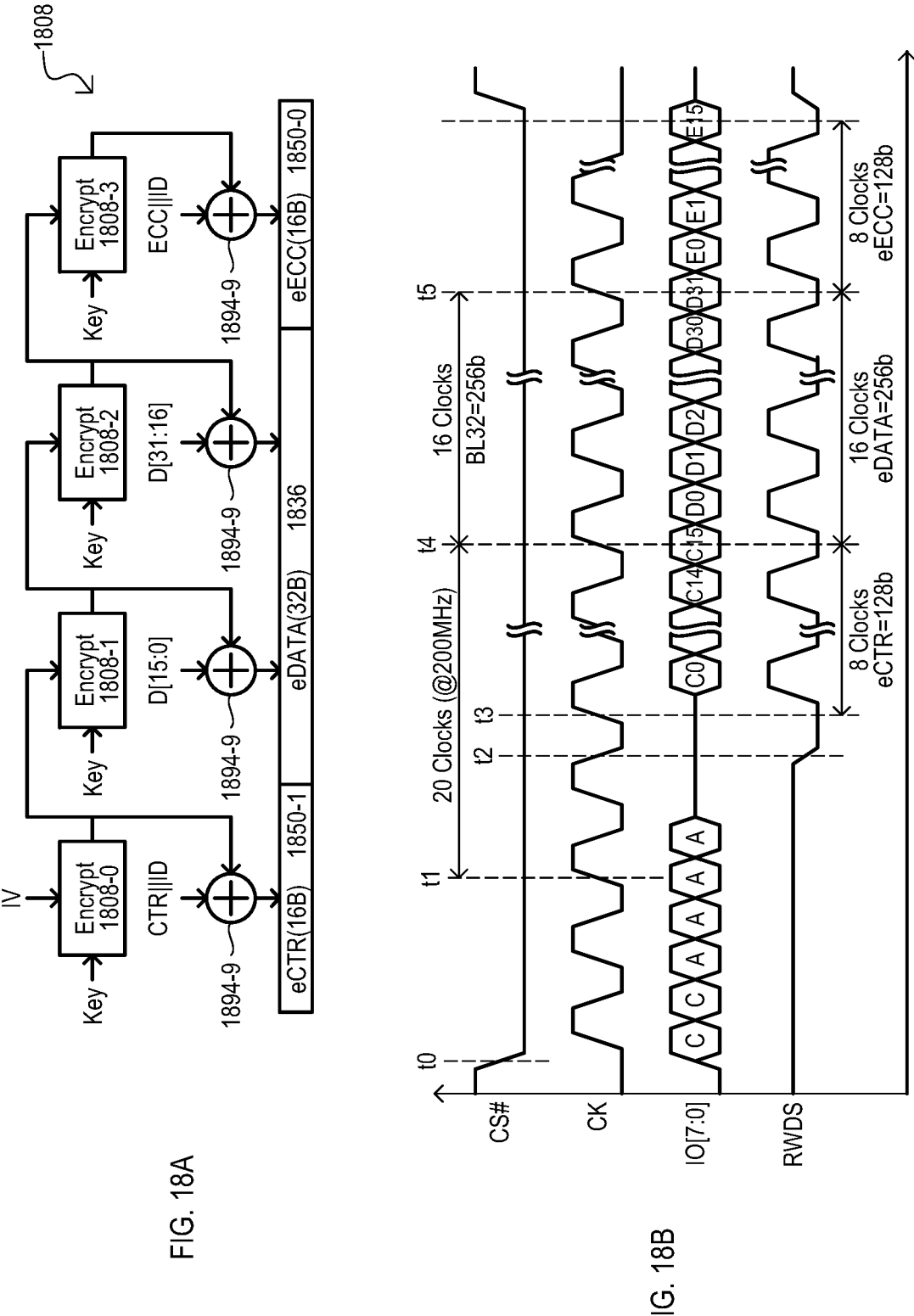
FIGS. 18A and 18B are diagrams showing output feedback mode generation of encrypted data and authentication tags, as well as a corresponding system operation according to embodiments.

FIG. 18A is a block diagram showing another encryption engine 1808 that can be included in an embodiment like that of FIG. 14A. Encryption engine 1808 can be an output feedback mode engine and include block cipher operations 1808-0/1/2/3 and XOR operations 1894-9.

A first block cipher operation 1808-0 can encrypt an IV with a key. The result can be XORed 1894-9 with a counter value (CTR∥ID) to generate an encrypted counter tag 1850-1 and forwarded for a second block cipher operation 1808-1 with the encryption key. The result from second block cipher operation 1808-1 can be XORed 1894-9 with first data D[15:0] to generate a first portion of encrypted data 1836 and forwarded to a third block cipher operation 1808-2 with the encryption key. The result from third block cipher operation 1808-2 can be XORed 1894-9 with second data D[31:16] to generate a second portion of encrypted data 1836 and forwarded to a fourth block cipher operation 1808-2 with the encryption key. The result from fourth block cipher operation 1808-3 can be XORed 1894-9 with an ECC code corresponding to the data [31:0] concatenated with another mutual value (CTR‖ID) to generate an ECC encrypted tag 1850-0.

FIG. 18B is a timing diagram for system using encryption like that shown in FIG. 18A. FIG. 18B shows operations like those shown in FIG. 12B. However, following command and address data from a host, a memory device can first return an encrypted counter tag (C0 to C15), followed by encrypted data (D0 to D31), followed by an encrypted ECC tag (E0 to E15). Such an order can result from the order of execution provided by the output feedback mode engine.

In this way, a memory device can include an output feedback mode to rapidly generate encrypted data and a corresponding tag in authenticated transactions.

FIG. 19A is a block diagram of a system 1900 according to a further embodiment. A system 1900 can include items like those of FIG. 14A, and such like items are referred to with the same reference character but with the leading digits being a "19" instead of "14".

FIG. 19A can differ from FIG. 14A in that encryption and decryption engines can be Ascon AEAD type engines. In the NOR memory 1902, authentication circuit 1908 can be an encryption engine 1908 that, in addition to read data 1934, receives a key value, an initial value (IV) and a nonce value, which can also be known to a host device. Please note that SPI bus 1988 is merely an example to illustrate one embodiment of the disclosure and should not be construed as a limitation. Other types of buses may be used to transmit data between host SoC 1904 and NOR memory 1902 in other embodiments.

In the host device 1904, a decryption circuit 1920 can receive encrypted data 1936 and an encrypted tag 1950 and execute decryption operations using a same key value, IV and nonce used by NOR memory 1902. Decryption engine 1920 can output decrypted data 1932. In addition, decryption engine 1920 can generate an encrypted compare tag 1946 from decrypted data, key, IV and nonce. A tag compare circuit 1944 can compare a received encrypted tag 1950 to that generated by decryption engine 1920. A result can be authentication failure 1948-1 or authentication success 1948-0.

FIG. 19B is a timing diagram for showing operations for a system like that of FIG. 19A. FIG. 19B includes items like those of FIG. 14B, however, transaction data (eD0 to eD31) can be available after 20 clocks (at 200 MHz) followed by a corresponding encrypted tag (eT0 to eT15).

In this way, authenticated memory device transactions can utilize an Ascon AEAD encryption engine to generate encrypted data and a corresponding encrypted tag.

FIG. 19C is a block diagram showing an Ascon AEAD encryption engine 1908 that can be included in an embodiment like that of FIG. 19A. Encryption engine 1908 can receive data in two 16 byte portions, D[15:0] and D[31:16], and generate corresponding encrypted data portions eDATA0 1936-0 and eDATA1 1936-1, as well as a 16 byte encrypted tag eTAG 1950. Encryption engine 1908 can include transformation operations 1994-0/1A/1B/2 and XOR operations 1994-90 to -96. Transformation operations (1994-0/1A/1B/2) can perform a transformation function "p" a number of rounds ("a" or "b"). Such transformations can include three steps, including an XORing with a constant, bitwise substitution with 5-bit "S-boxes", and linear diffusion, as understood for Ascon type cyphers.

Encryption engine 1908 can include an initialization section 1908-0, encryption section 1908-1 and a tag generation section 1908-2. An initialization section 1908-0 can receive an initial input value formed by concatenating a 64-bit IV, 128 bit key and 128 bit nonce. First transformation operation 1994-0 can execute 12 rounds on the input value. A resulting 192-bit output value can be XORed 1994-90 with a padded key value ($0^{64}\|K^{128}$) and the resulting value XORed 1994-91 with a value $0^{191}\|1$. An encryption section 1908-1 can XOR 1994-92 a first 128 bits of data output from initialization section 1908-0 with a first portion of output (e.g., read data) D[15:0] to generate first encrypted data eDATA0 1936-0.

Second transformation operation 1994-1A can execute 8 rounds on encrypted data eDATA0 1936-0 and the 192 bit value from XOR operation 1994-91. A first 128 bits output from second transformation function 1994-1 can be XORed 1994-93 with a second portion of output data D[31:16] to generate second encrypted data eDATA1 1936-1. A third transformation operation 1994-1B can receive second encrypted data (eDATA1) as a first input and 192 bits output from second transformation operation 1994-1A. A 128-bit output from third transformation operation 1994-1B can be XORed 1994-94 with a value $1\|0^{128}$.

Tag generation section 1908-2 can receive an output of XOR operation 1994-94 as a first input to fourth transformation operation 1994-2. The last 192 bits output from second transformation operation 1994-1 can be XORed 1994-95 with a padded key value ($K^{128}\|0^{64}$) to generate a second input to fourth transformation operation 1994-2. Fourth transformation operation 1994-2 can output a 128-bit value that can be XORed 1994-96 with a key ($K^{128}$) to generate an encrypted tag eTAG 1950. In this way, single transaction memory access operations can be authenticated using Ascon type cyphers.

Figure 20A:
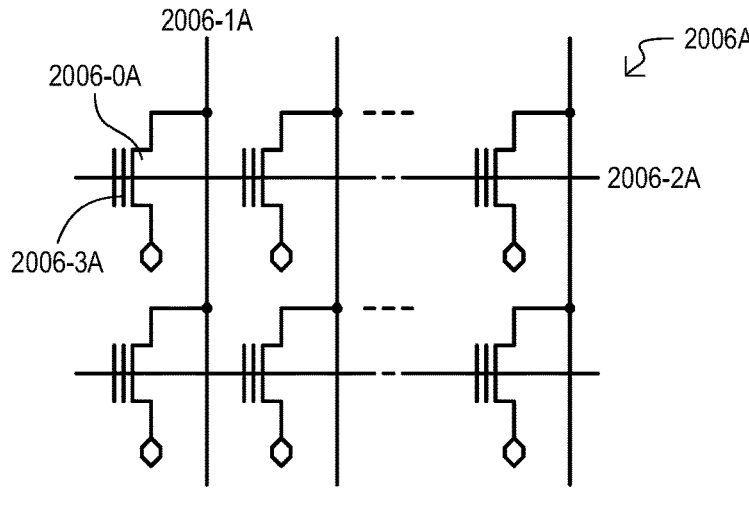
FIGS. 20A and 20B are schematic diagrams of a memory cell arrays that can be included in embodiments.

While embodiments can include any suitable NVM array structure or NVM cell type, some embodiments can include 1-transistor (1T) NOR type arrays. FIG. 20A is a schematic diagram of a 1T NOR array 2006A that can be included in embodiments. Array 2006A can include a number of memory cells (one shown as 2006-0A) arranged into rows and columns, with memory cells of a same row being connected to a same word line (one shown as 2006-2A) and memory cells of a same column being connected to a same bit line (one shown as 2006-1A). In some embodiments, memory cells (2006-0A) can be formed with a single transistor structure, having a charge storing structure 2006-3A between a control gate and a channel. A charge storing structure 2006-3A can store one or more bits of data as charge (including absence of charge) without the need for power to maintain the data. A charge storing structure 2006-3A can take any suitable form including but not limited to: a floating gate, a charge storing dielectric (e.g., replacement gate), or a combination thereof.

In some embodiments, authenticated read commands as described herein and equivalents can be used to access nonvolatile memory cells, to enable rapid and secure reading of data from a NOR memory device, including XiP code reading operations.

Figure 20B:
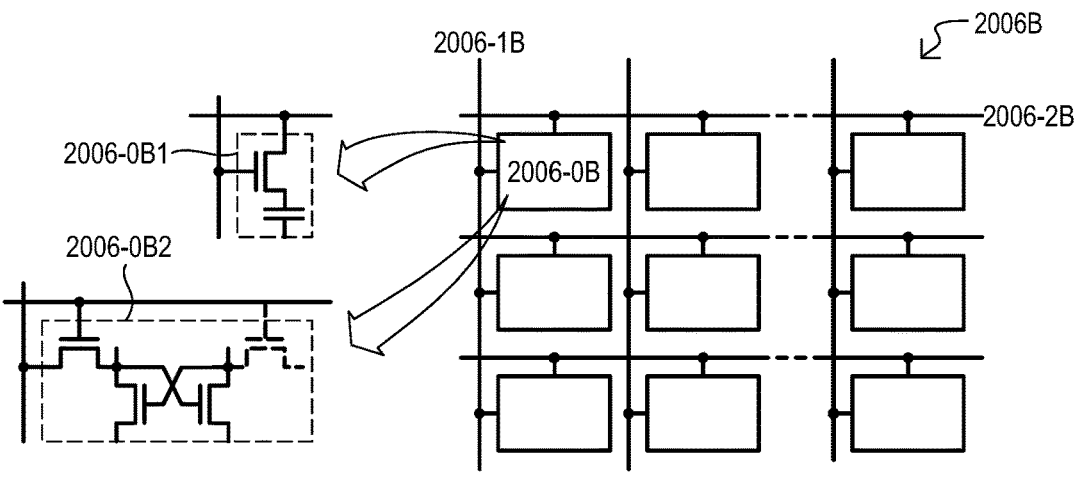

Embodiments can also include any suitable volatile array structure or volatile memory cell type. FIG. 20B is a schematic diagram of possible volatile memory cells arrays that can be included in embodiments. FIG. 20B shows an array 2006B that can include a number of volatile memory cells (one shown as 2006-0B) arranged into rows and columns and connected to one or more bit lines (e.g., 2006-1B) and word lines (e.g., 2006-2B). Volatile memory cells (2006-0B) can take any suitable form, including but not limited to DRAM cells 2006-0B1 and/or SRAM cells 2006-0B2. SRAM cells 2006-0B2 can include, but are not limited to, 4-transistor (4T), 6T and/or 8T variations.

Figure 20C:
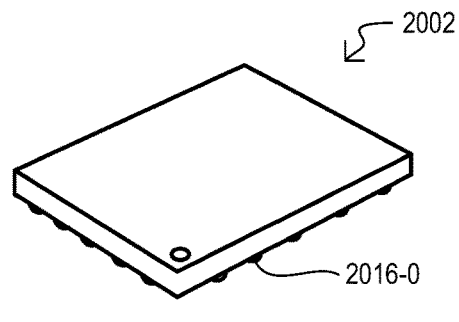
FIG. 20C is a diagram of a memory integrated circuit (IC) device according to embodiments.

While embodiments can include devices and systems with various interconnected components, embodiments can also include unitary devices which can execute initiator and/or responder device functions as described herein. In some embodiments, such unitary devices can be advantageously compact single integrated circuits (i.e., chips). FIG. 20C shows a packaged memory IC device 2002 which can execute per transaction authentication in response to requests from another device (e.g., host device) according to other embodiments described herein. Encrypted data and/or authentication values can be output on one or more external bus connections (one shown as 2016-0). However, a memory device according to embodiments can include any other suitable integrated circuit packaging type, as well as direct bonding of a device chip onto a circuit board or substrate.

In this way, an IC memory device can authenticate transactions by transmitting encrypted data and/or one or more authentication tags that can authenticate the transmitted data and/or the IC memory device itself.

Figures 21A, 21B, 22A:
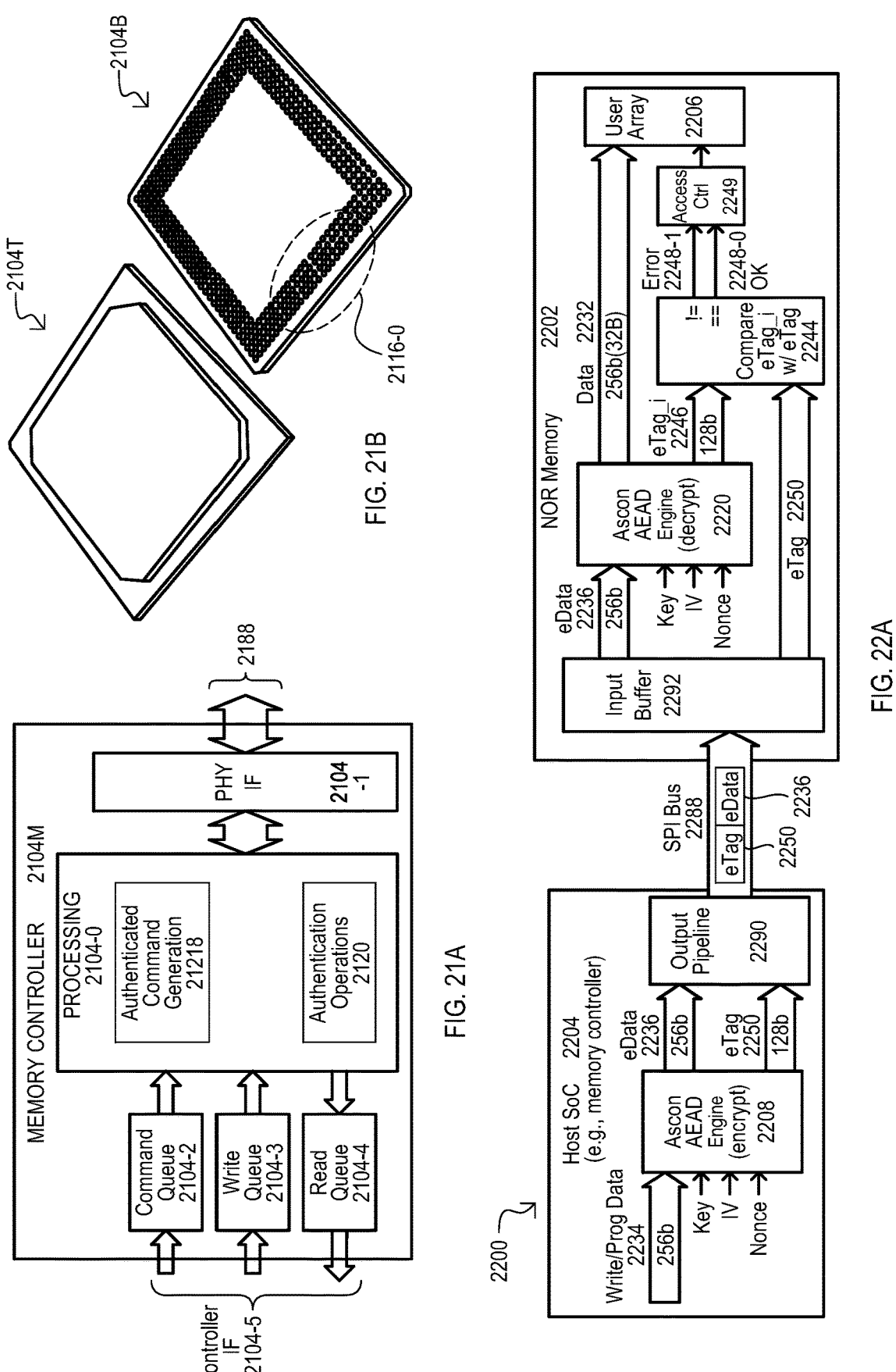
FIG. 21A is a block diagram of a host device according to an embodiment.
FIG. 21B shows diagrams of an IC host device according to embodiments.
FIGS. 22A, 22B and 22C are diagrams showing a system and operations having host encryption according to embodiments.

While embodiments can include NVM devices, embodiments can also include memory controller circuits can generate command and address values for authenticated transactions over an interface compatible with an NVM device. Such a memory controller can be part of a host device. FIG. 21A shows a memory controller 2104M according to an embodiment.

A memory controller 2104M can include a command queue 2104-2, a write queue 2104-3, a read queue 2104-4, transaction processing circuits 2104-0, and an IF circuit 2104-1. A command queue 2104-2, a write queue 2104-3 and read queue 2104-4 can be connected to a controller IF 2104-5, which can be part of a larger host device, or connected to a host device via a communication path. A command queue 2104-2 can receive memory request over controller IF 2104-5 to access a NVM device connected to a bus 2188. In some embodiments, command can distinguish between authenticated transactions and standard transactions. However, in other embodiments, no such distinction can exist and a memory controller 2104M can generate suitable command signals to indicate authenticated transactions. A write queue 2104-3 can receive write data that is to be programmed into an NVM device over bus 2188. A read queue 2104-4 can output read data received from an NVM device over bus 2188.

Transaction processing circuits 2104-0 can include authenticated read command generation circuits 2118 and, optionally, authentication operation circuits 2108. Authenticated command generation circuits 2118 can generate bit values for a command that will be recognized by a NVM device as an authenticated request, as opposed to a standard request. Authenticated commands can take the form of any of those described herein, or equivalents. Authentication operation circuits 2120 can perform some or all of the processing for authenticating transaction data, as described herein, or equivalents. However, in alternate embodiments, such processing can be executed by circuits (not shown) that receive read data via read queue 2104-4 and/or provide write data via write queue 2104-3.

An interface 2104-1 and corresponding bus 2188 can be any suitable bus, including but not limited to a bidirectional serial bus and/or unidirectional command-address bus with a bidirectional parallel data bus In this way a memory controller can generate authenticated transaction commands for processing by a memory device.

While embodiments can include systems with memory devices operating in conjunction with a host device, embodiments can also include standalone host devices having authentication ops circuits and one or more memory device IFs formed in a single IC package. Such an embodiment is shown in FIG. 21B. FIG. 21B shows a packaged host device in a perspective top view 2104T and bottom view 2104B. Host device 2104T/B can include a number of physical connections (e.g., 2116-0 all or a portion of which can be connected to a memory device IF as described herein. Such IF(s) can receive authenticated transactions for processing, as described herein and equivalents. In some embodiments, a host device can be a System-On-Chip (SoC) type device. It is understood that host devices can include any other suitable package type.

In this way, an IC host device can process authenticated transactions by receiving encrypted data and/or one or more authentication tags to authenticate received transaction data.

While embodiments can include systems with memory devices that can transmit data with authentication values, embodiments can also include host devices that can transmit data to memory devices with authentication values. FIG. 22A shows a system 2200 according to such an embodiment.

A system 2200 can include items like those shown in FIG. 19A, and such like items are referred to by the same reference character but with the leading digits being "22" instead of "19". In FIG. 22A, a host device 2104 can include encrypting circuits like those of memory device 1902 in FIG. 19A. Such encrypting circuits can encrypt write/program data 2234 with an AEAD engine 2208 and generate an encrypted tag 2250 and encrypted data 2236. Encrypted tag 2250 and data 2236 can be transmitted over a bus 2288 to memory device 2202. Such data can be accompanied by, or preceded by a command (e.g., write program).

A memory device 2202 can include decryption circuits like those of host device 1904 in FIG. 19A. Encrypted tag 2250 and data 2236 can be received at an input buffer 2292. AEAD engine 2200 can decrypt the data and generate an encrypted tag 2246 for comparison with the received encrypted tag 2250 in compare circuit 2244. In addition, memory device 2202 can include access control circuit 2249 that can control whether decrypted data 2232 is written or programmed into a user array 2206.

While FIG. 22A shows a host device 2204 with encryption circuits of a particular type (i.e., Ascon AEAD) alternate embodiments can include any other suitable encryption circuits. Also, a host device 2204 can include decryption circuits as described herein and equivalents. Along these same lines, while a memory device 2202 includes decryption circuits of a particular type, alternate embodiments can include any other suitable decryption circuits. Also, a memory device 2202 can include encryption circuits as described herein and equivalents.

Figures 22B, 22C:
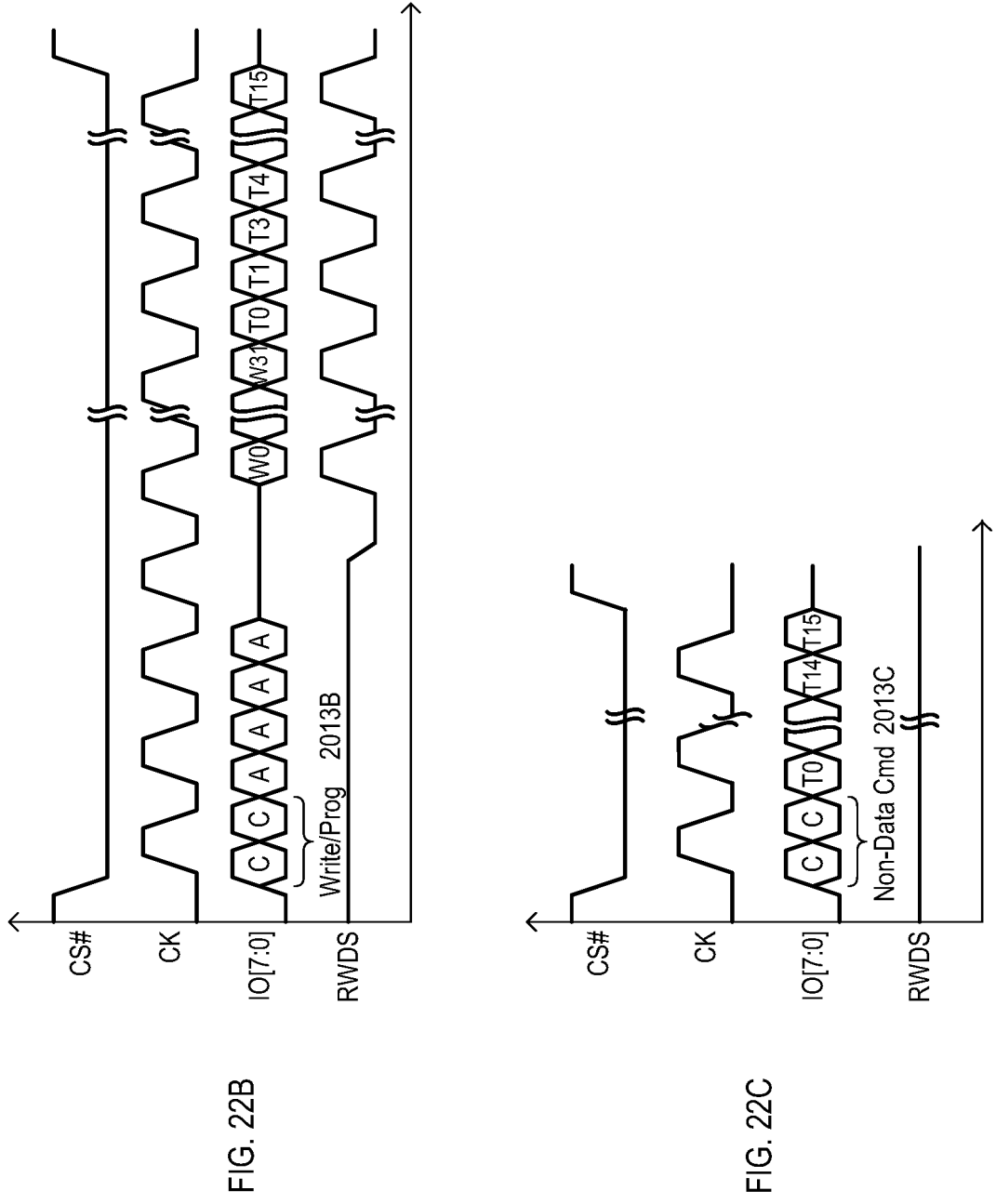

FIG. 22B is a timing diagram showing authentication operations of a host device according to an embodiment. A host device can assert CS # signal active, and then issue data related commands (2013B) and corresponding address values (A). Subsequently, data (W0 to W31) with corresponding tag data (T0 to T15) can be transmitted by a host device. A host device can then return CS # signal to an inactive level. In some embodiments, a command 2103B can be a write or program command and data (W0 to W31) can be write/program data. While FIG. 22B shows a latency between address (A) and data (W0 to W31), in other embodiments, such data (W0 to W31) can directly follow the address data. Further, tag data (T0 to T15) can be transmitted prior to, or interspersed with, data (W0 to W31).

FIG. 22C is a timing diagram showing authentication operations of a host device according to another embodiment. A host device can issue a non-data related command (2013C) with corresponding tag data (T0 to T15).

In this way, a host device can issue commands, with or without corresponding data, along with a tag value.

Figure 23A:
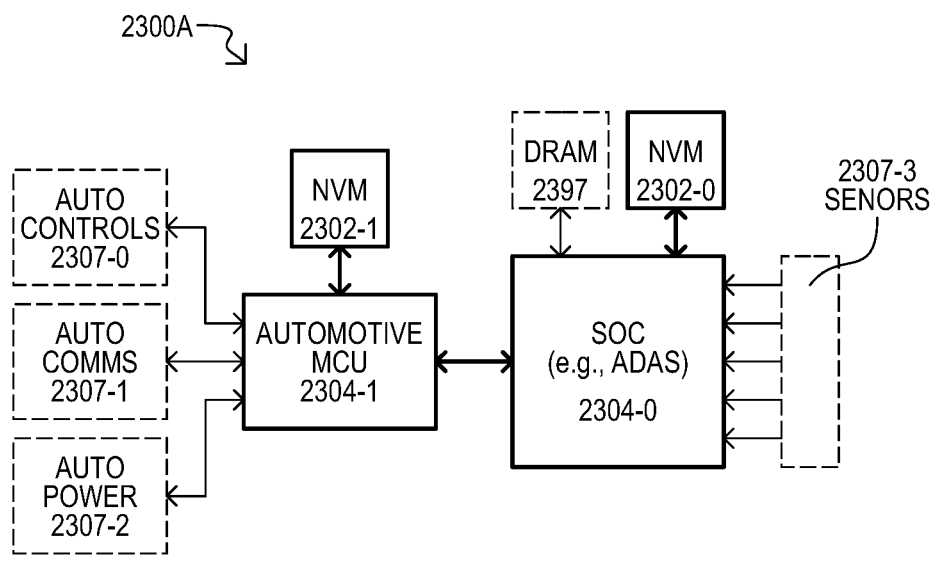
FIGS. 23A and 23B are diagrams showing automobile systems according to embodiments.

Embodiments can include any suitable system having a need for rapid, secure access of stored data. However, embodiments can be advantageous in systems that access code from high reliability, secure memory devices, such as automobile systems. FIG. 23A shows an automobile system 2300A according to an embodiment. System 2300A can include a first NVM device 2302-0, second NVM device 2302-1, a SoC 2304-0, automotive microcontroller (MCU) 2304-1, sensors 2307-3, auto controls 2307-0, auto communications systems 2307-1, and auto power systems 2307-2, and optionally, dynamic random access memory (DRAM) device 2397.

SoC 2304-0 and first NVM device 2302-0 can be a host device and corresponding NVM memory device according to any of the embodiments shown herein. Accordingly, using authenticated transactions, SoC 2304-0 can securely execute code in place from NVM device 2302-0, eliminating the need to copy such code to a "shadow" volatile memory for authentication prior to execution. In some embodiments, SoC 2304-0 can configure NVM device 2302-0 for authenticated transactions. Alternatively, SoC 2304-0 can be in possession of a command set that includes authenticated commands that differ from standard commands, where such authenticated commands are understood (i.e., decodable) by NMV device 2302-0. Similarly, MCU 2304-1 and second NVM 2302-1 can be a host device and corresponding NVM device according to any of the embodiments shown herein, or equivalents.

While a DRAM device 2397 can be included, such a device can serve purposes other than shadowing code, as Soc/MCU 2304-0/1 can execute code in place from NVM devices 2302-0/1.

In this way, an automobile control system can include per transaction authentication between controlling devices and NVM devices, including executing code in place through such authenticated transactions.

Figure 23B:
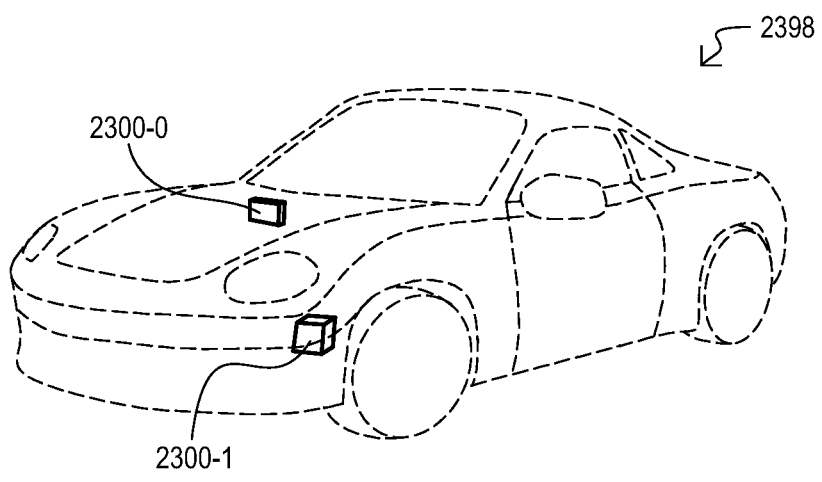

Referring to FIG. 23B an automobile system 298 according to an embodiment is shown in a diagram. An automobile system 2398 can have numerous sub-systems (two shown as 2300-0 and 2300-1) that operate with firmware accessed from an NVM device. Such sub-systems (2300-0, 2300-1) can include an electronic control unit (ECU) and/or an advanced driver assistance system (ADAS). However, in other embodiments such sub-systems can include a dashboard display/control sub-system and/or an infotainment sub-system, as but two of numerous possible examples. Each subsystem (2300-0, 2300-1) can include a host device and one or more NVM devices and employ firmware authentication through per transaction authentication as described herein, or equivalents.

In this way, an automobile can benefit from fast, secure access to NVM devices through authenticated transactions.

While embodiments can include any of the methods described herein with reference to the various operations, devices and systems, additional methods will now be described with reference to flow diagrams. It is understood that all, or portions of the described methods can be combined with one another.

Figure 24:
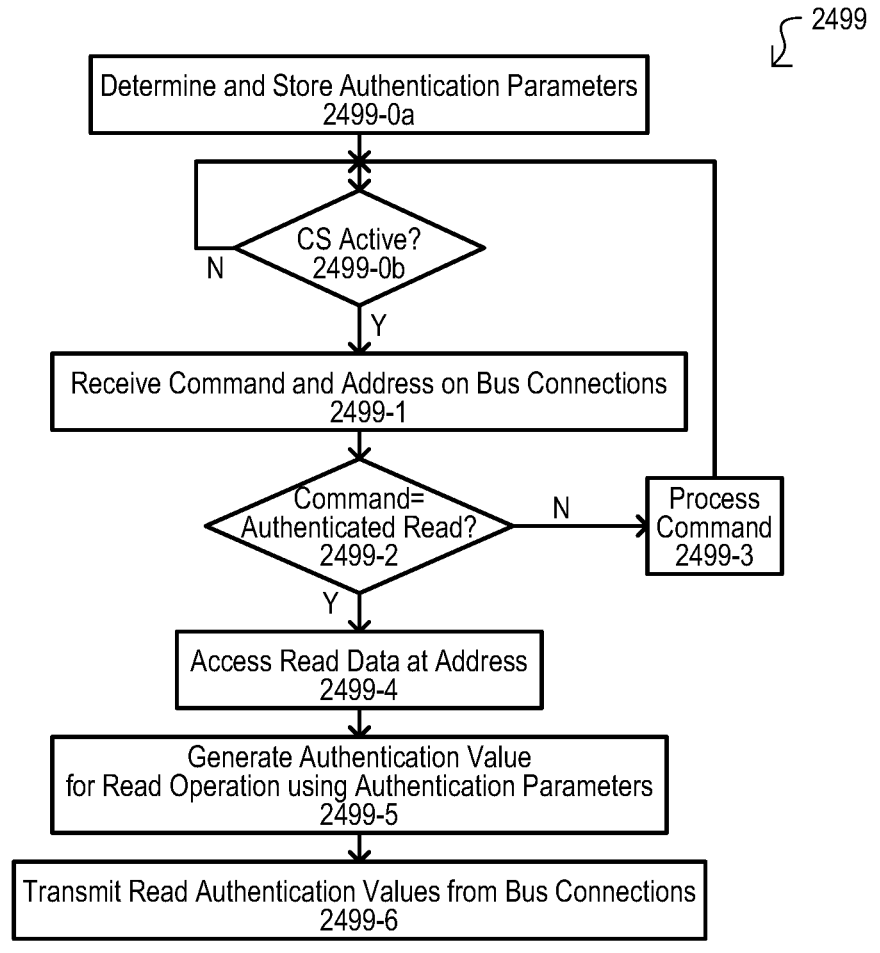
FIG. 24 is a flow diagram of a method according to an embodiment.

FIG. 24 is a flow diagram of a method 2499 according to an embodiment. A method 2499 can be executed by circuits of a memory device as described herein or equivalents. A method 2499 can include determining and storing authentication parameters 2499-0a. Such an action can include a memory device communicating with a host device to establish parameters for per transaction authentication, including but not limited to: keys, key precursors, device identification values, counter values, seed values (e.g., IVs), identification of encryption algorithms, and identification of a key infrastructure. However, as noted herein, all or a portion of the authentication parameters may be established through a manufacturing step (e.g., values programmed into a secure memory of the device).

A method 2499 can determine if a CS signal is active 2499-0b. If a CS signal is not active (N from 2499-0b), a method can wait for such an indication. If a CS signal is active (Y from 2499-0b), a command and address can be received at bus connections 2499-1. Such an action can include receiving command and address data compatible with any of the bus IFs described herein, including but not limited to serial bus IFs (e.g., SPI type buses, CAN type buses, I2C type buses, USB type buses), as well as parallel bus IFs (e.g., DDR type buses, including LPDDR type buses).

A method 2499 can determine if an authenticated read command has been received 2499-2. Such an action can include determining if a memory device is in a particular mode and/or determining if received command bit values correspond to an authenticated read operation. If an authenticated read command has not been received (N from 2499-2), a received command can be processed accordingly 2499-3. If an authenticated read command has been received (Y from 2499-2), read data can be accessed at an address indicated by the read command 2499-4. Such an action can include decoding received address values.

A method 2499 can generate one or more authentication values for the read operation using authentication parameters 2499-5. Such an action can include any of those described herein and equivalents, including but not limited to: encrypting read data, generating a tag from read data and generating a tag from data mutually known to both the memory device and the command issuing device (e.g., host).

A generated authentication value can be transmitted from bus connections 2499-6. Such an action can include any of those described herein and equivalents, including but not limited to: transmitting encrypted read data, transmitting one or more unencrypted tags and transmitting one or more encrypted tags. A transmitted tag can be transmitted before corresponding read data, after corresponding read data, or interspersed with read data.

In this way, an authentication value in response to an authenticated read command to a memory device.

Figure 25:
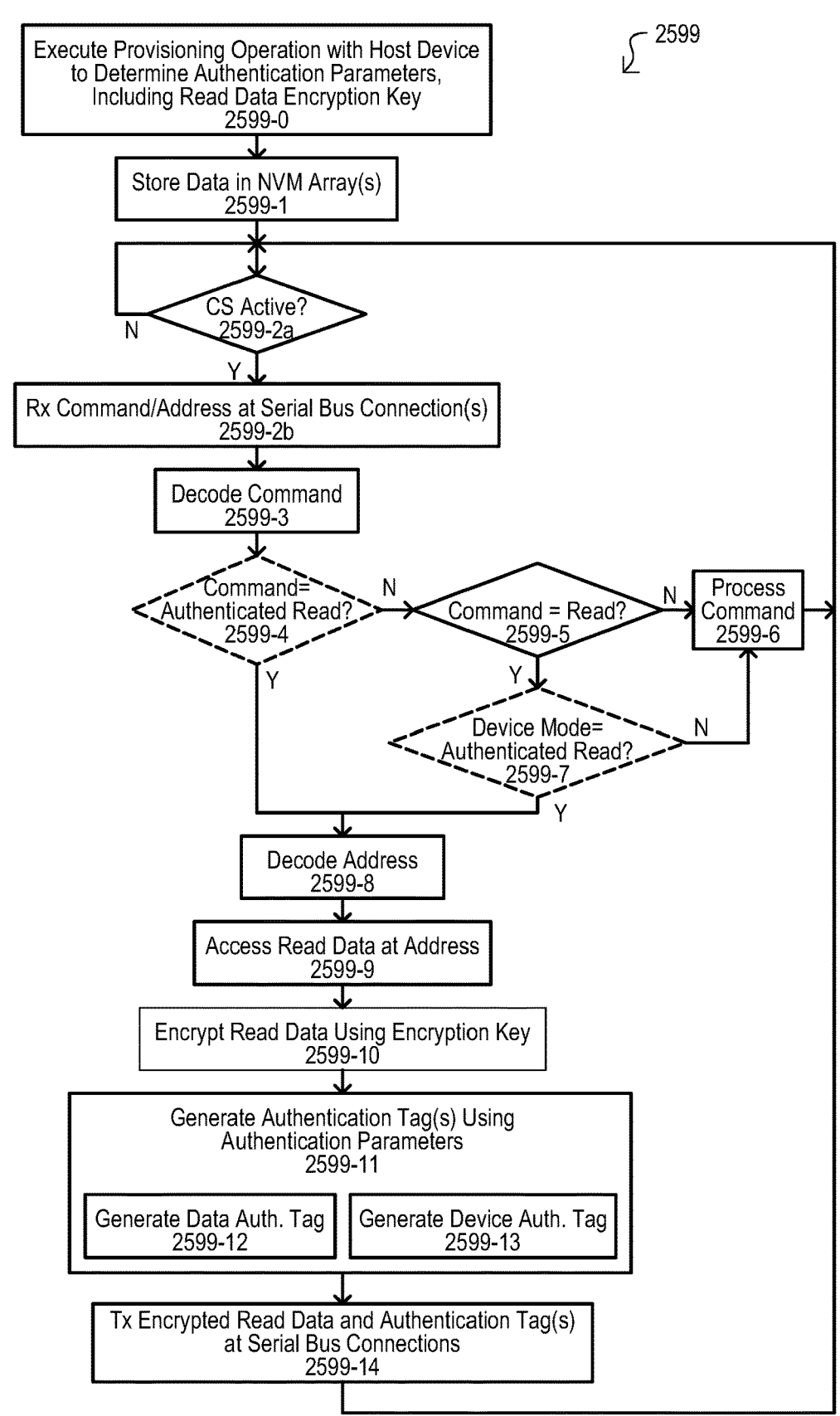
FIG. 25 is a flow diagram of a method according to another embodiment.

FIG. 25 is a flow diagram of method 2599 according to another embodiment. A method 2599 can be executed by circuits of a memory device as described herein and equivalents. A method 2599 can include executing a provisioning operation with a host device to establish authentication parameters, including a read data encryption key 2599-0. Data can be stored in NVM array(s) 2599-1. Storage of data in arrays can include programming data into NVM arrays by a host or other device.

If a CS signal is active (Y from 2599-2a), a command and address can be received at serial bus connections 2599-2. In some embodiments, such an action can include a NOR NVM device receiving commands and address on a SPI type bus. A received command can be decoded 2599-3. Such actions can include operations of command decoder circuits on a memory device.

A method 2599 can vary according to a configuration of a memory device. If a memory device is configured to distinguish authenticated read commands from standard commands, a method 2599 can determine if a received command is an authenticated read command 2599-4. If an authenticated read command has not been received (N from 2599-4), a method can determine if a standard read command has been received 2599-5. If a standard read command has not been received (N from 2599-5), the (non-read) command can be processed 2599-6.

If a memory device is not configured to distinguish between authenticated read command and standard commands, a method 2599 can skip 2599-4 and determine if a received command is a read command 2599-4. If a read command has been received (Y from 2599-5), a method can determine if a device is in an authenticated read mode 2599-7. Such an action can include having mode registers set in the memory device or other such device configuration circuits (e.g., protected registers, fusible links, anti-fuses or the like).

If an authenticated read command has been received (Y from 2599-4) or a read command is received in an authenticated read mode (Y from 2599-7), a corresponding address can be decoded 2599-8. Such an action can include operations of an address decoder of a memory device. Read data at the address can be accessed 2599-9. Such an action can include any suitable access operations, including accessing data in predetermined sizes (e.g., 32 B cache line).

Read data can be encrypted using the encryption key 2599-10. Such an action can include any suitable cryptographic techniques, including but not limited to passes through one or more block cipher circuits on the memory device. An authentication tag can be generated using authentication parameters 2599-11. Such an action can include any of the tag generation approaches described herein and equivalents. Accordingly, a generated tag can be data authentication tag 2599-12 and/or a device authentication tag 2599-13. Encrypted read data and authentication tag(s) can then be transmitted at the serial bus connections 2599-14. Such an action can include ordering and/or interspersing tag(s) with encrypted data according to the embodiments described herein, or equivalents.

In this way, a method can execute a provisioning operation with a host device to establish authentication parameters. In response to encrypted read command requests, read data can be encrypted and output with an authentication tag which can authenticate the read data, can authenticate the memory device, or both.

Figure 26:
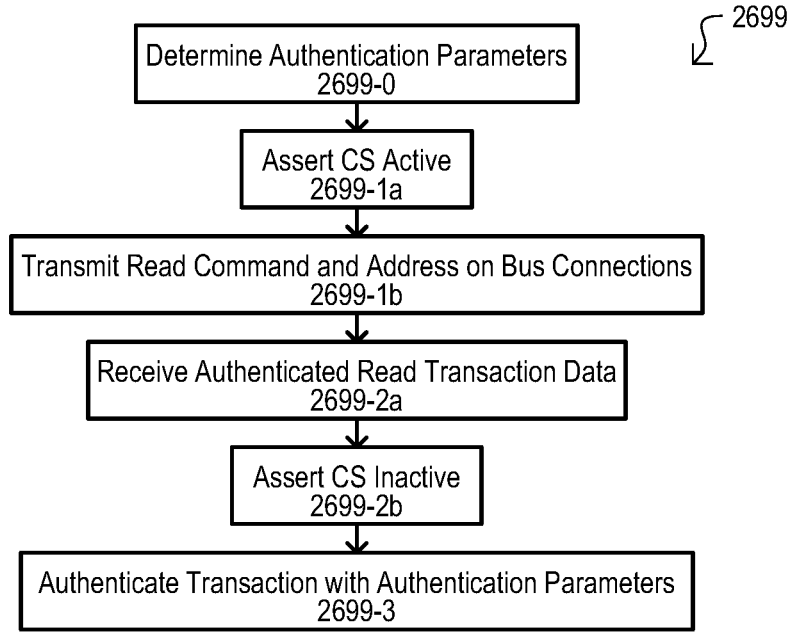
FIG. 26 is a flow diagram of a method according to another embodiment.

FIG. 26 is a flow diagram of a method 2699 according to another embodiment. A method 2699 can be executed by a host device as described herein and equivalents. A method 2699 can include determining authentication parameters 2699-0. Such an action can include communicating with a memory device to establish parameters for per transaction authentication as described herein. Also, all or a portion of the authentication parameters may be established through a manufacturing step.

A CS signal can be asserted active 2699-1*a*. A read command and address can be then transmitted on bus connections 2699-1*b*. Such an action can include transmitting a standard read command (e.g., a read command that does not call for authentication) or an authenticated read command. Bus connections can take the form of any of those described herein.

Authenticated read transaction data can be received 2699-2*a*. Such an action can include receiving encrypted read data alone, encrypted read data with one or more tags, or unencrypted read data with one or more tags. The CS signal can be asserted to an inactive state 2699-2*b*. The transaction can be authenticated with the authentication parameters 2699-3. Such an action can include the various host authentication operations described herein or equivalents.

In this way, a host device can issue a command to a memory device and authenticate the resulting transaction with the memory device.

Figure 27:
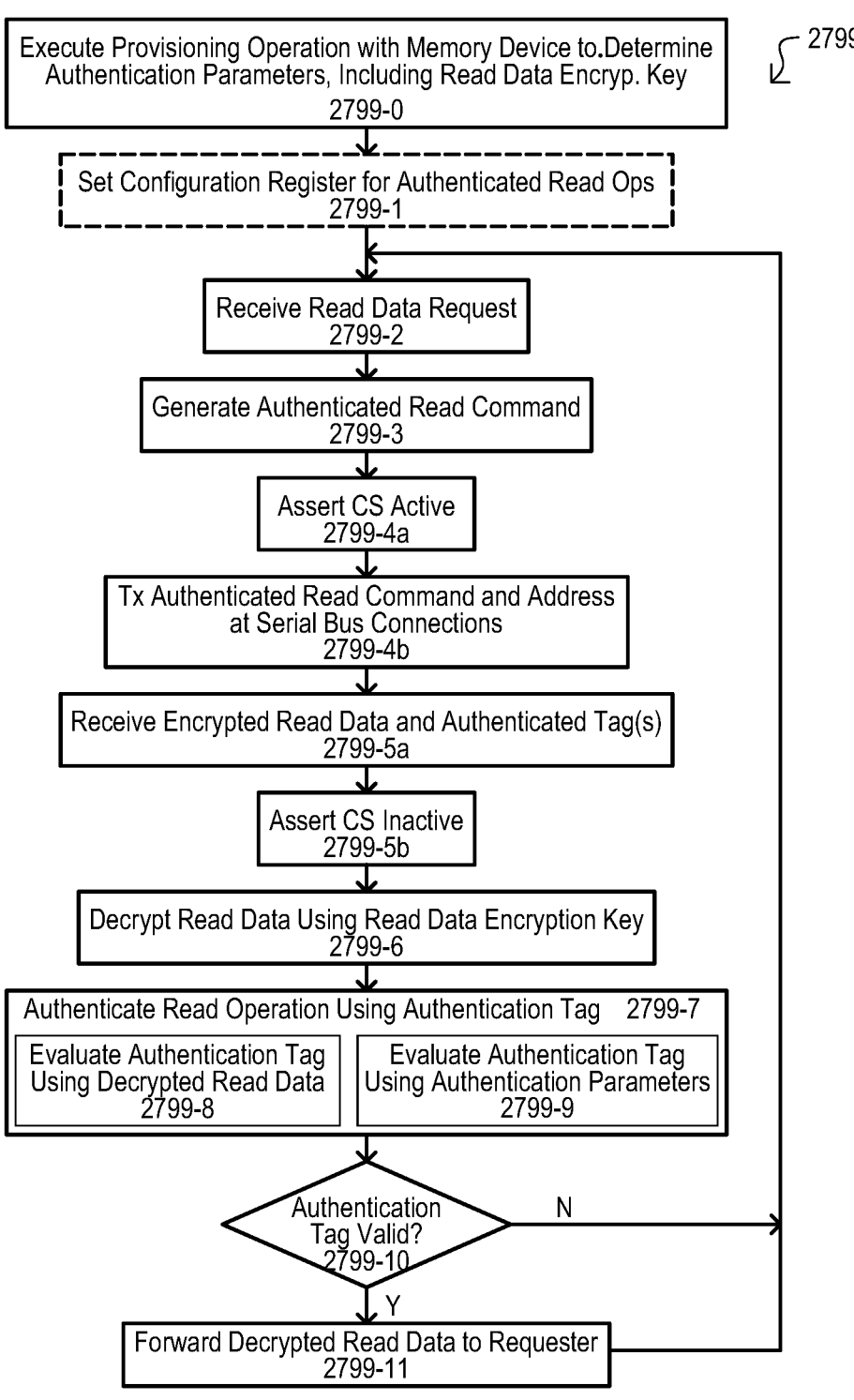
FIG. 27 is a flow diagram of a method according to another embodiment.

FIG. 27 is a flow diagram of a method 2799 according to another embodiment. A method 2799 can be executed by circuits of a host device as described herein and equivalents. A method 2799 can include executing a provisioning operation with a memory device to determine authentication parameters, including a read data encryption key 2799-0. In some embodiments, where there are no authenticated read commands, a method 2799 can set a configuration register for authenticated read operations 2799-1. Such an action can include writing predetermined values to a configuration register in a memory device.

A method 2799 can receive a read data request 2799-2. Such an action can include an application serviced by a host device requesting data stored at an address. Such an address can be a physical address, or a logical address that can be translated to a physical address.

An authenticated read command can be generated 2799-3. In the event a memory device is configured to evaluate all read commands as authenticated read commands, such an action can include issuing a standard read command. However, in the event the memory device can distinguish between authenticated read commands and read commands, such an action can include generating the appropriate bit values to identify the authenticated read command. A CS signal can be asserted active 2799-4*a*, and the authenticated read command and address can be transmitted at serial bus connections 2799-4*b*. Such an action can include any of the interfaces/standards described herein or equivalents.

Encrypted read data can be received with one or more authentication tags 2799-5*a*. Such an action can include receiving encrypted read data and tags in the various formats described herein and equivalents. A CS signal can be asserted inactive 2799-5*b*. Read data can be decrypted using a read data encryption key 2799-6. The read operation can then be authenticated using one or more tags received with the encrypted read data 2799-7. Such an action can take any of the forms described herein or equivalents. This can include evaluating an authentication tag using decrypted read data 2799-8, for tags that authenticate the read data, and/or evaluate the authentication tag using authentication parameters 2799-9, for tags that authenticate the device.

If the authentication tag(s) indicate the transaction is not valid (N from 2799-10), the method 2799 can return and wait for the receipt of another read data request 2799-2. If the authentication tag(s) indicate the transaction is valid (Y from 2799-10), decrypted read data can be forwarded to a requester 2799-11. A method 2799 can then return and wait for the receipt of another read data request 2799-2.

In this way a host device can establish authentication parameters with a memory device and issue authenticated read commands. Received encrypted read data can be decrypted and the read operation authenticated with one or more received tags.

Embodiments can include methods, devices and systems that include receiving a CS signal at an integrated circuit (IC) device; determining the CS signal has transitioned from inactive to active and receiving at least target address information at a bus interface of the IC device. In response to the target address information, data stored at a corresponding storage location of the IC device can be retrieved. By operation of authentication circuits of the IC device, generating an authentication value with at least one cryptographic function using at least the authentication parameters and the retrieved data. Transmit the authentication value with the retrieved data from the IC device. Receiving the target address, retrieving the data, generating the authentication value and transmitting the authentication value and retrieved data all occur while the CS signal remains active after transitioning from inactive to active.

Embodiments can include methods, devices and systems having storage circuits configured to store authentication parameters and data; control circuits configured to, while a chip select (CS) signal remains asserted active, retrieve data stored at a location in the device indicated by target address information; authentication circuits configured to, while the CS signal remains asserted active, generate an authentication value with at least one cryptographic function that uses the authentication parameters and the retrieved data; and a bus interface circuit configured to receive the CS signal and target address information, and, while the CS signal remains asserted active, transmit the authentication value with the retrieved data; wherein the storage circuits, control circuits, authentication circuits, IO circuits and bus interface circuits are formed with a same IC substrate.

Embodiments can include methods, devices and systems with an IC device that includes storage circuits configured to store authentication parameters and data, control circuits configured to, while a chip select (CS) signal remains asserted active, retrieve data stored at a location in the device indicated by target address information, and authentication circuits configured to, while the CS signal remains asserted active, generate an authentication value with at least one cryptographic function using at least the authentication parameters and the retrieved data. A bus system can be configured to, while the CS signal remains asserted active, transmit at least the target address information and the CS signal to the IC device, and transmit the authentication value and retrieved data from the IC device.

Methods devices and systems according to embodiments can further include by operation of the authentication circuits, encrypting the retrieved data to generate encrypted data; and the retrieved data being output with the authentication value is the encrypted data.

Methods devices and systems according to embodiments can further include the IC device comprising at least one memory cell array; and the storage location is at least one of a plurality of storage locations in the memory cell array.

Methods devices and systems according to embodiments can further include the IC device comprises a plurality of registers; and the storage location is at least one of the registers.

Methods devices and systems according to embodiments can further include receiving a command with the target address value at the bus interface, the command identifying an operation to be executed by the IC device; and the command being received while the CS signal remains active after initially transitioning from inactive to active Methods devices and systems according to embodiments can further include transmitting the authentication value with the retrieved data from the IC device is selected from the group of: transmitting from the bus interface and transmitting over data outputs different than the bus interface.

Methods devices and systems according to embodiments can further include by operation of a host device, transitioning the CS signal from inactive to active, receiving the retrieved data and authentication value from the IC device, using at least the authentication parameters and authentication value to authenticate the retrieved data, and executing processor functions using the authenticated retrieved data.

Methods devices and systems according to embodiments can further include the authentication value output with the retrieved data has an order selected from the group of: being output after the retrieved data, being output prior to the retrieved data, and being output interspersed with the retrieved data.

Methods devices and systems according to embodiments can further include bus interface circuits are further configured to transmit the authentication value with respect to the retrieved data in an order selected from the group of: being output after the retrieved data, being output prior to the retrieved data, and being output interspersed with the retrieved data.

Methods devices and systems according to embodiments can further include a host device coupled to the bus system and configured to assert the CS signal active and transmit at least the target address information to the IC device.

Methods devices and systems according to embodiments can further include a host device with host authentication circuits configured to authenticate retrieved data received from the IC device using the authentication parameters.

Methods devices and systems according to embodiments can further include the host authentication circuits that comprise an Ascon type authenticated cipher.

Methods devices and systems according to embodiments can further include a host device with at least one processor configured to execute functions with retrieved data authenticated by the host authentication circuits.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
receiving a chip select (CS) signal at an integrated circuit (IC) device;
determining the CS signal has transitioned from inactive to active;
receiving at least target address information at a bus interface of the IC device;
in response to the target address information, retrieving data stored at a corresponding storage location of the IC device;
by operation of authentication circuits of the IC device, generating an authentication value with at least one cryptographic function using at least the authentication parameters and the retrieved data; and
transmitting the authentication value with the retrieved data from the IC device; wherein
the CS signal remains active while receiving the target address, retrieving the data, generating the authentication value, and transmitting the authentication value and retrieved data.

2. The method of claim 1, further including:
by operation of the authentication circuits, encrypting the retrieved data to generate encrypted data; and
the retrieved data output with the authentication value are the encrypted data.

3. The method of claim 1, wherein:
the IC device comprises at least one memory cell array; and
the storage location is at least one of a plurality of storage locations in the memory cell array.

4. The method of claim 1, wherein:
the IC device comprises a plurality of registers; and
the storage location is at least one of the registers.

5. The method of claim 1, further including:
receiving a command with the target address information at the bus interface, the command identifying an operation to be executed by the IC device; and
the command being received while the CS signal remains active.

6. The method of claim 1, wherein:
transmitting the authentication value with the retrieved data from the IC device is selected from the group of: transmitting from the bus interface and transmitting over data outputs different than the bus interface.

7. The method of claim 1, further including:
by operation of a host device,
transitioning the CS signal from inactive to active,
receiving the retrieved data and authentication value from the IC device,
using at least the authentication parameters and authentication value to authenticate the retrieved data, and
executing processor functions using the authenticated retrieved data.

8. The method of claim 1, wherein:
the authentication value output with the retrieved data has an order selected from the group of: being output after the retrieved data, being output prior to the retrieved data, and being output interspersed with the retrieved data.

9. A device, comprising:
storage circuits configured to store authentication parameters and data;
control circuits configured to, while a chip select (CS) signal remains asserted active, retrieve data stored at a location in the device indicated by target address information;
authentication circuits configured to, while the CS signal remains asserted active, generate an authentication value with at least one cryptographic function that uses the authentication parameters and the retrieved data; and
a bus interface circuit configured to
receive the CS signal and target address information, and
while the CS signal remains asserted active, transmit the authentication value with the retrieved data; wherein
the storage circuits, control circuits, authentication circuits, and bus interface circuits are formed with a same integrated circuit (IC) substrate.

10. The device of claim 9, wherein:
the authentication circuits are further configured to, while the CS signal remains asserted active, encrypt the retrieved data to generate encrypted data; and
the bus interface circuit is configured to, while the CS signal remains asserted active, transmit the authentication value with the encrypted data.

11. The device of claim 9, wherein:
the storage circuits comprise a memory cell array; and
the data are stored in the memory cell array.

12. The device of claim 9, wherein:
the storage circuits comprise a plurality of registers; and
the data are stored in at least one of the registers.

13. The device of claim 9, wherein the bus interface is further configured to receive command information with the address information while the CS signal remains asserted active.

14. The device of claim 9, wherein:
the bus interface circuits are further configured to transmit the authentication value with respect to the retrieved data in an order selected from the group of: being output after the retrieved data, being output prior to the retrieved data, and being output interspersed with the retrieved data.

15. A system, comprising:
an integrated circuit (IC) device that includes
storage circuits configured to store authentication parameters and data,
control circuits configured to, while a chip select (CS) signal remains asserted active, retrieve data stored at a location in the device indicated by target address information, and
authentication circuits configured to, while the CS signal remains asserted active, generate an authentication value with at least one cryptographic function using at least the authentication parameters and the retrieved data; and
a bus system configured to, while the CS signal remains asserted active,
transmit at least the target address information and the CS signal to the IC device, and
transmit the authentication value and retrieved data from the IC device.

16. The system of claim 15, wherein:
the authentication circuits are further configured to, while the CS signal remains asserted active, encrypt the retrieved data to generate encrypted data; and the bus system is configured to, while the CS signal remains asserted active, transmit the authentication value with the encrypted data.

17. The system of claim 15, further including:

a host device coupled to the bus system and configured to assert the CS signal active, and transmit at least the target address information to the IC device.

18. The system of claim 17, wherein:

the host device includes host authentication circuits configured to authenticate retrieved data received from the IC device using the authentication parameters.

19. The system of claim 18, wherein:

the host authentication circuits comprise an Ascon type authenticated cipher.

20. The system of claim 17, wherein:

the host device includes at least one processor configured to execute functions with retrieved data that is authenticated by the host authentication circuits.

\* \* \* \* \*